United States Patent
Tsumiyama

(10) Patent No.: US 7,802,489 B2
(45) Date of Patent: Sep. 28, 2010

(54) BICYCLE CONTROL DEVICE

(75) Inventor: Akira Tsumiyama, Sakai (JP)

(73) Assignee: Shimano Inc., Osaka (JP)

( * ) Notice: Subject to any disclaimer, the term of this patent is extended or adjusted under 35 U.S.C. 154(b) by 1519 days.

(21) Appl. No.: 11/140,923

(22) Filed: Jun. 1, 2005

(65) Prior Publication Data
US 2006/0272443 A1 Dec. 7, 2006

(51) Int. Cl.
*F16C 1/10* (2006.01)
(52) U.S. Cl. .................................................. 74/502.2
(58) Field of Classification Search ................ 74/473.3, 74/478, 490.12, 490.14, 500.5, 501.5 R, 501.6, 74/502.2, 512, 519, 527, 529, 532, 533, 535, 74/577 R, 473.1, 473.14, 473.15
See application file for complete search history.

(56) References Cited

U.S. PATENT DOCUMENTS

| | | | |
|---|---|---|---|
| 5,012,692 A | 5/1991 | Nagano | |
| 5,044,213 A | 9/1991 | Nagano | |
| 5,203,213 A | 4/1993 | Nagano | |
| 5,241,878 A | 9/1993 | Nagano | |
| 5,257,683 A | 11/1993 | Romano | |
| 5,400,675 A | 3/1995 | Nagano | |
| 5,479,776 A | 1/1996 | Romano | |
| 5,660,082 A * | 8/1997 | Hsieh | 74/502.2 |
| 5,730,030 A | 3/1998 | Masui | |
| 5,775,168 A * | 7/1998 | Furuta | 74/489 |
| 6,073,730 A | 6/2000 | Abe | |
| 6,192,772 B1 | 2/2001 | Huang | |
| 6,216,078 B1 | 4/2001 | Jinbo et al. | |
| 6,502,477 B1 | 1/2003 | Assel | |
| 6,553,861 B2 * | 4/2003 | Ose | 74/502.2 |
| 6,647,823 B2 * | 11/2003 | Tsumiyama et al. | 74/501.6 |
| 6,698,567 B2 * | 3/2004 | Dal Pra' | 192/217 |
| 7,124,873 B2 * | 10/2006 | Tsumiyama | 192/217 |
| 2002/0124679 A1 | 9/2002 | Dal Pra | |
| 2004/0005947 A1 | 1/2004 | Shahana et al. | |
| 2005/0252330 A1 * | 11/2005 | Denk | 74/502.2 |
| 2006/0086198 A1 * | 4/2006 | Tsumiyama | 74/502.2 |
| 2006/0260427 A1 * | 11/2006 | Tsumiyama | 74/502.2 |

FOREIGN PATENT DOCUMENTS

| | | |
|---|---|---|
| DE | 10025696 A1 | 11/2000 |
| DE | 100 55 922 A1 | 5/2002 |
| DE | 10055403 A1 | 5/2002 |

(Continued)

*Primary Examiner*—Vicky A Johnson
(74) *Attorney, Agent, or Firm*—Global IP Counselors, LLP

(57) ABSTRACT

A bicycle control device is configured with an operating member that selectively controls a braking unit and a shifting such that shifting and braking can be easily performed while braking. The operating member has a user engagement part and a wire connecting portion with a support structure pivotally coupled to the user engagement part and a wire attachment member movably coupled to the support structure by a universal coupling. Also the operating member can perform a braking operation without movement of the main parts of the shifting unit. The shifting unit is movably disposed around a center shifting axis to provide a compact structure. The shifting unit has a position control mechanism that is configured to operate a positioning member that moves through two of a plurality of predetermined shift positions during a single progressive movement of the operating member.

22 Claims, 17 Drawing Sheets

FOREIGN PATENT DOCUMENTS

| | | |
|---|---|---|
| EP | 0 731 019 A2 | 9/1996 |
| EP | 1 502 847 A1 | 2/2005 |
| JP | S60-186291 U | 12/1985 |
| JP | H03-55518 Y2 | 12/1991 |
| TW | 361426 | 6/1999 |
| TW | 390324 | 5/2000 |
| TW | 426008 | 3/2001 |
| WO | WO 00/06446 A1 | 2/2000 |

* cited by examiner

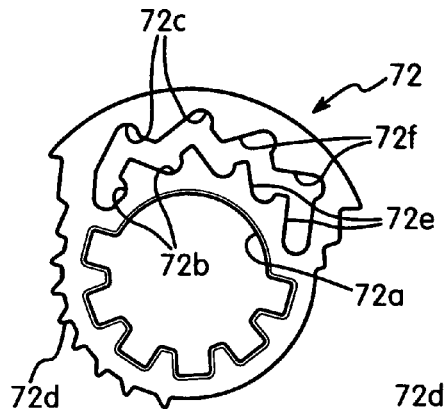
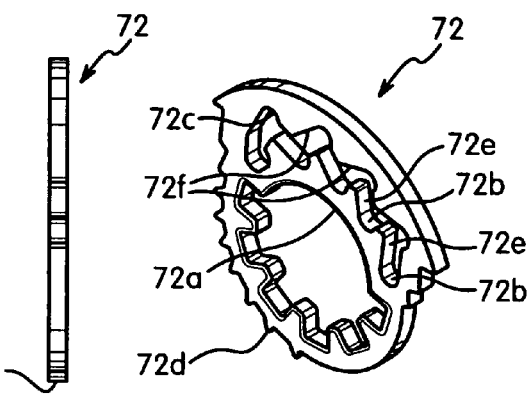
Fig. 30    Fig. 31    Fig. 32
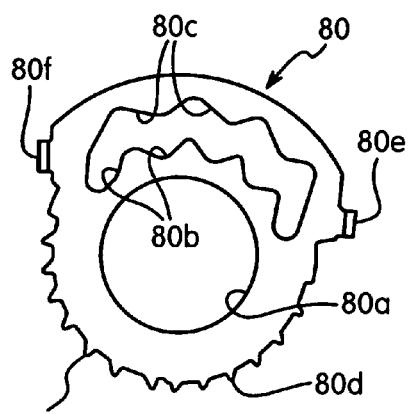
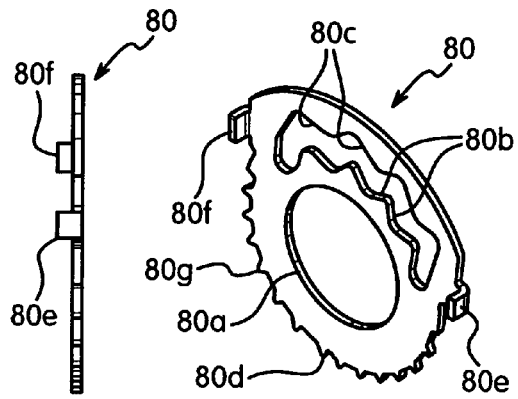
Fig. 33    Fig. 34    Fig. 35
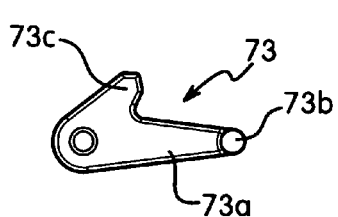
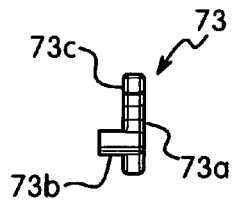
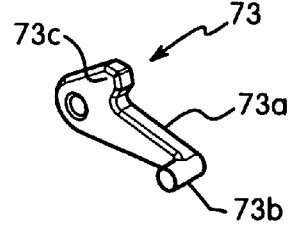
Fig. 36    Fig. 37    Fig. 38

BICYCLE CONTROL DEVICE

BACKGROUND OF THE INVENTION

1. Field of the Invention

This invention generally relates to a bicycle control device. More specifically, the present invention relates to a bicycle control device that performs both shifting and braking operations.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

Generally, when riding a bicycle, it is desirable to be able to operate the brake control mechanism and the shift control mechanism of the bicycle quickly and easily while maintaining a firm grasp on the handlebar. Some bicycles have brake levers that are separate from and the shifting devices such as disclosed in U.S. Patent Application Publication No. US2004/0005947 (assigned to Shimano, Inc.). However, other bicycle control devices have been developed the combine both the braking and shifting functions into a single unit. Examples of such control devices of this type are disclosed in the following U.S. Pat. Nos. 4,241,878; 5,257,683; 5,400,675; and 6,073,730; and 6,216,078. For effecting braking and speed change, some of these known control devices have a brake lever that also acts as a shift lever that winds a wire takeup element and a release lever located behind a brake/shift lever. While other known control devices have a shift lever that winds a wire takeup element located behind a brake lever and a release lever that is located laterally of the brake lever. Thus, the rider can carry out braking and speed change operations without the rider changing from one lever to another. One example of a bicycle control device with a single brake/shift lever is disclosed in U.S. Patent Application Publication No. US2002/0139637 (assigned to Shimano, Inc.).

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

One object of the present invention is to provide a bicycle control device with an operating member that is simple to operate during braking and gear shifting operations.

Another object of the present invention is to provide a relatively compact bicycle control device that allows the rider to carry out braking and speed change operations.

Another object of the present invention is to provide a bicycle control device that is relatively simple and inexpensive to manufacture and assemble.

The foregoing objects can basically be attained by providing a shift and brake control device that has a bicycle mounting portion, a shifting unit and an operating member. The shifting unit is coupled to the bicycle mounting portion and configured to selectively move between a plurality of shift positions. The operating member is pivotally mounted about a braking axis to perform a braking operation and about a shifting axis to perform a shifting operation. The operating member includes a user engagement part and a brake wire connecting part that is pivotally coupled about a pivot axis relative to the user engagement part.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 30 is a side elevational view of the positioning plate of the shift position control mechanism for the bicycle control device illustrated in FIGS. 2-16;

FIG. 31 is an edge elevational view of the positioning plate illustrated in FIG. 30 of the shift position control mechanism for the bicycle control device illustrated in FIGS. 2-16;

FIG. 32 is a perspective view of the positioning plate illustrated in FIGS. 30 and 31 of the shift position control mechanism for the bicycle control device illustrated in FIGS. 2-16;

FIG. 33 is a side elevational view of the cam releasing plate of the shift position control mechanism for the bicycle control device illustrated in FIGS. 2-16;

FIG. 34 is an edge elevational view of the cam releasing plate illustrated in FIG. 33 of the shift position control mechanism for the bicycle control device illustrated in FIGS. 2-16;

FIG. 35 is a perspective view of the cam releasing plate illustrated in FIGS. 33 and 34 of the shift position control mechanism for the bicycle control device illustrated in FIGS. 2-16;

FIG. 36 is a side elevational view of the detent member of the shift position control mechanism for the bicycle control device illustrated in FIGS. 2-16;

FIG. 37 is an edge elevational view of the detent member illustrated in FIG. 36 of the shift position control mechanism for the bicycle control device illustrated in FIGS. 2-16; and FIG. 38 is a perspective view of the detent member illustrated in FIGS. 36 and 37 of the shift position control mechanism for the bicycle control device illustrated in FIGS. 2-16.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
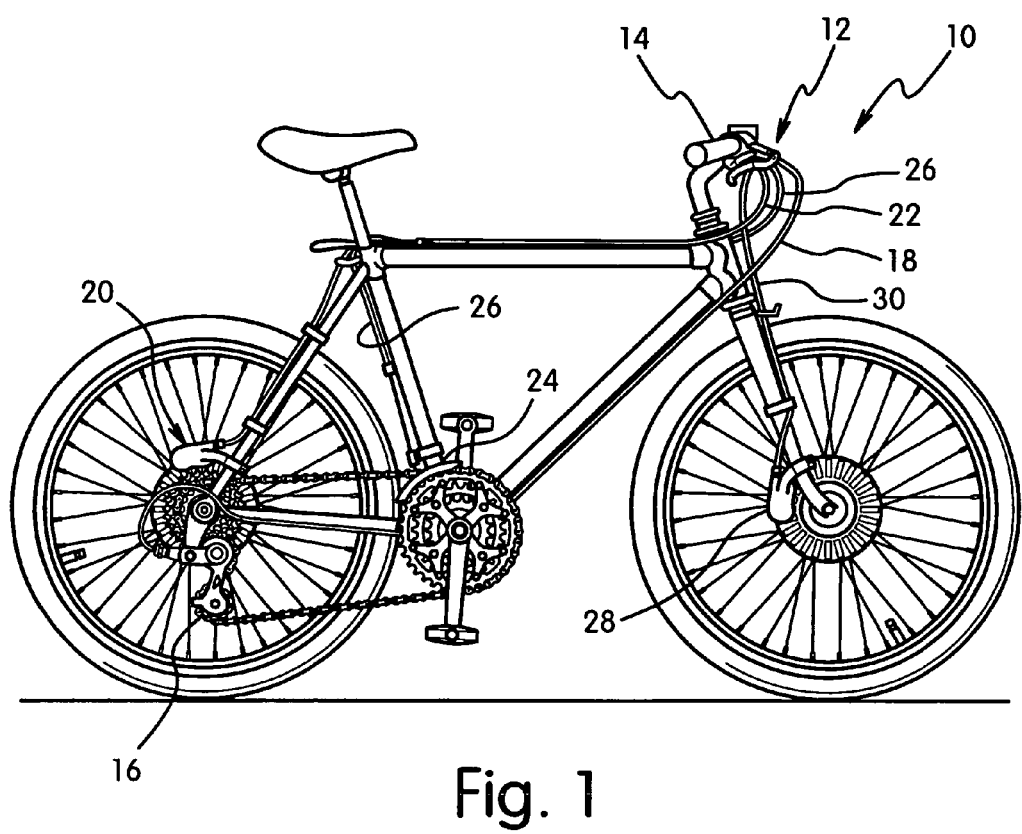
FIG. 1 is a side elevational view of a bicycle equipped with a pair of control devices (only one shown) in accordance with one embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18 and to a rear brake device 20 via a rear brake cable 22. This bicycle control device 12 is preferably a combined shift and brake control device that is configured and arranged to perform both a shifting operation and braking operation with a single lever as explained below. Alternatively, the bicycle control device 12 can be connected a front brake device 28 via a brake cable 30, if needed and/or desired.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 24 via a shift control cable 26 and the front brake device 28 via the brake cable 30. Alternatively, if the brake cable 30 connects the bicycle control device 12 to the front brake device 28 in an alternate embodiment, then the left hand side bicycle control device would be operatively coupled to the rear brake device 20 via the rear brake cable 22. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein. Preferably, the cables 18, 22, 26 and 30 are conventional bicycle cables that have an outer casing the covers an inner wire. For example, the shift control cable 18 has an inner wire 18a and an outer casing 18b, while the rear brake cable 22 has an inner wire 22a and an outer casing 22b.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

As used herein to describe the bicycle control device 12, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the bicycle control device 12 of the present invention.

Referring now to FIGS. 2-6, the bicycle control device 12 is illustrated in the rest position. The bicycle control device 12 basically includes a bicycle handlebar mounting portion 31, a braking unit 32 and a shifting unit 33. In this embodiment, the braking unit 32 and the shifting unit 33 are integrated into the mounting portion 31.

As best seen in FIGS. 2, 3, 6, 7 and 16, the mounting portion 31 has a clamping section 31a, a shielding section 31b, a tubular shaft section 31c and a positioning control mounting section 31d. Preferably, the mounting portion 31 is constructed of a hard light weight rigid material such as a light weight metal.

Figure 2:
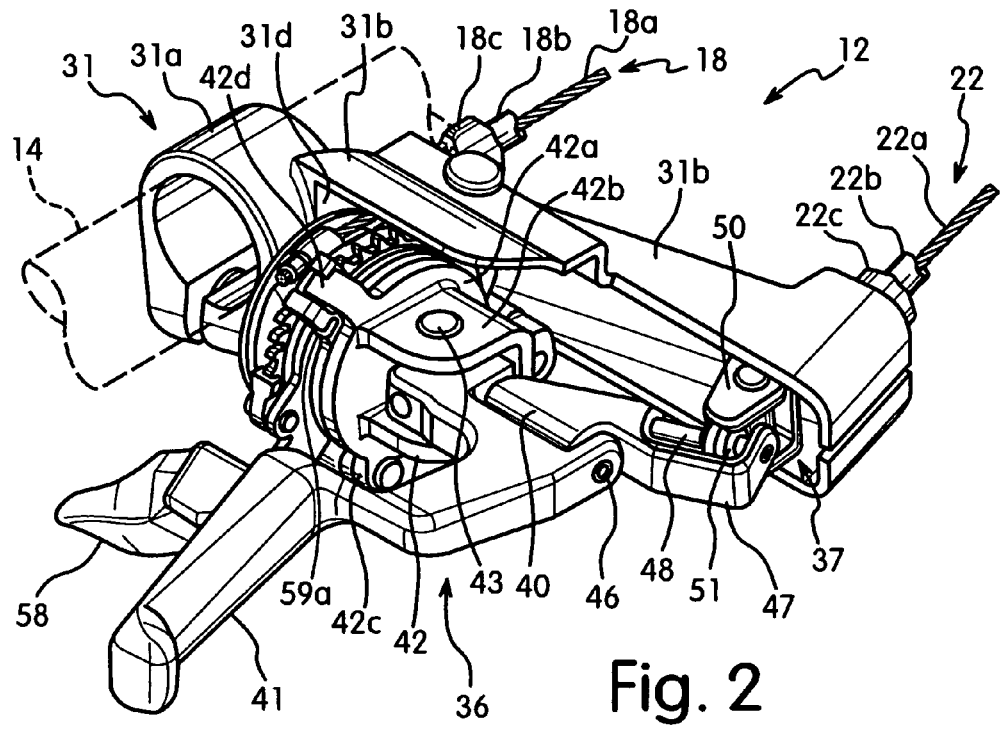
FIG. 2 is a top perspective view of the bicycle control device illustrated in FIG. 1, with the operating members in the rest position.
Figure 5:
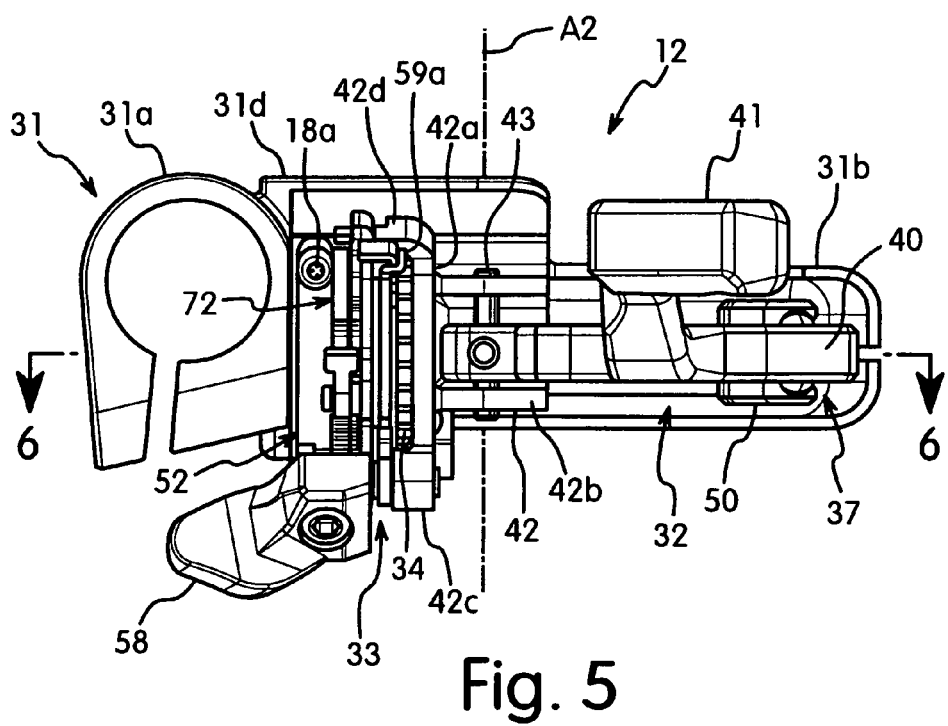
FIG. 5 is an outer side elevational view of the bicycle control device illustrated in FIGS. 1-4, with the operating members in the rest position.

As best seen in FIGS. 2 and 5, the clamping section 31a of the mounting portion 31 is preferably a split bore type of clamping arrangement in which the diameter of the bore is varied by a fixing bolt in a conventional manner. The clamping section 31a is relatively conventional in construction thus will not be discussed or illustrated in further detail herein.

As best seen in FIGS. 2, 3, 4 and 6, the shielding section 31b of the mounting portion 31 covers the top portion of the shifting unit 33. The shielding section 31b of the mounting portion 31 provides mounting points for the shift control cable 18 and the rear brake cable 22 that receives barrel type adjusters 18c and 22c, respectively.

Figure 6:
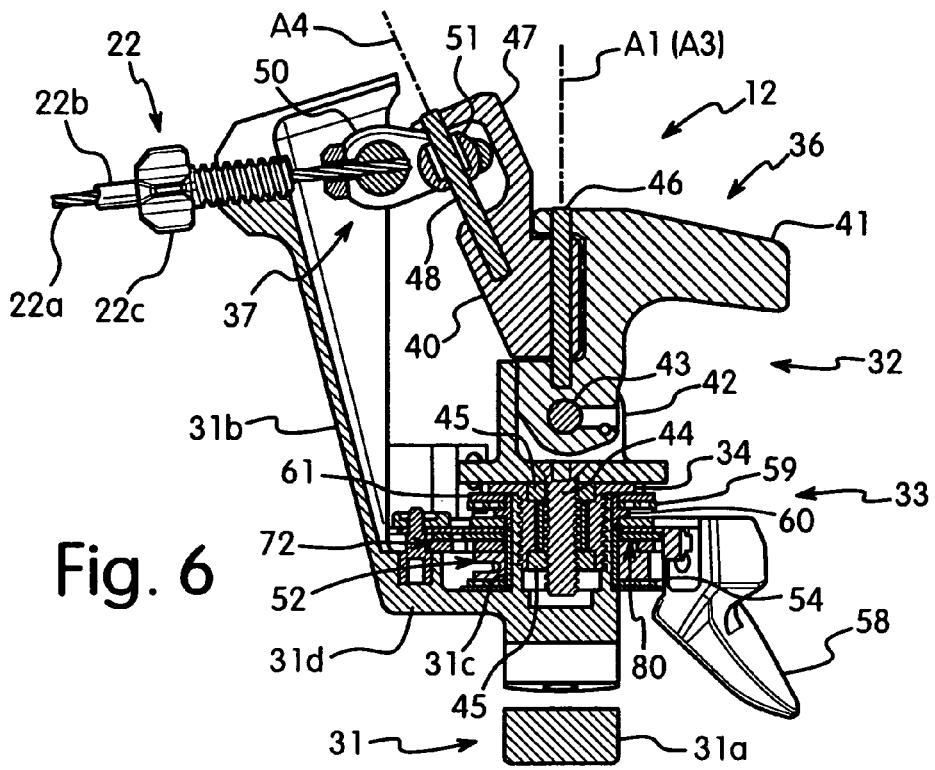
FIG. 6 is a partial cross sectional view of the bicycle control device as viewed along section line 6-6 of FIG. 5.
Figure 7:
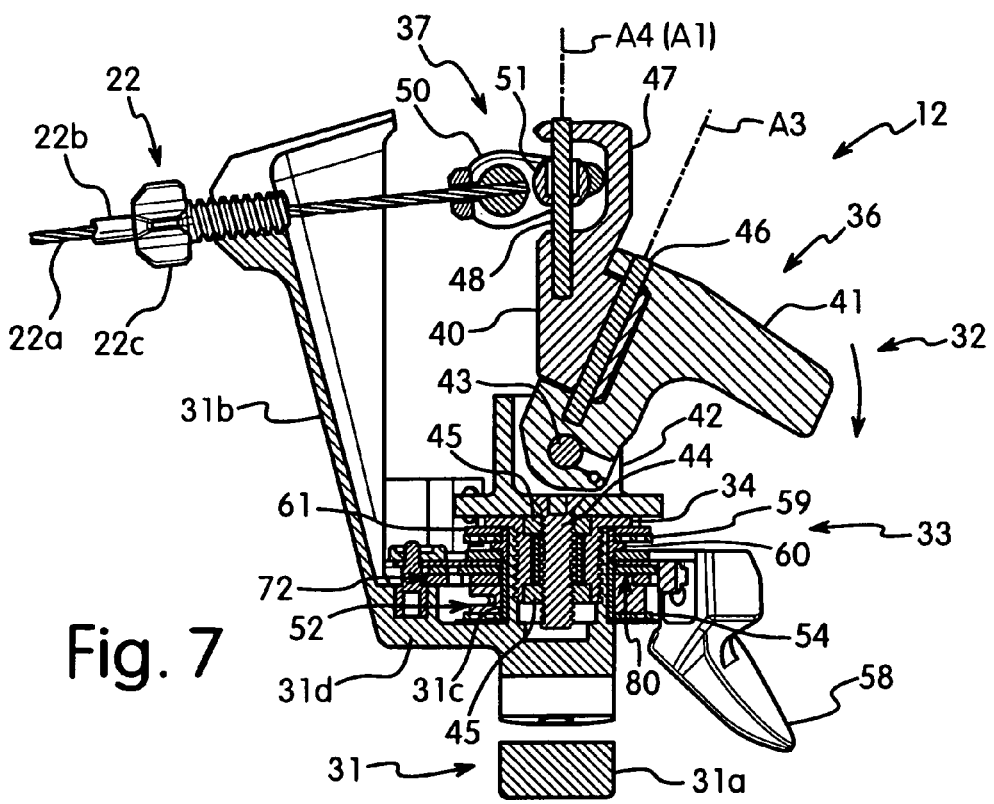
FIG. 7 a partial cross sectional view of the bicycle control device as viewed along section line 6-6 of FIG. 5, but with the main operating member moved to the braking position.
Figure 16:
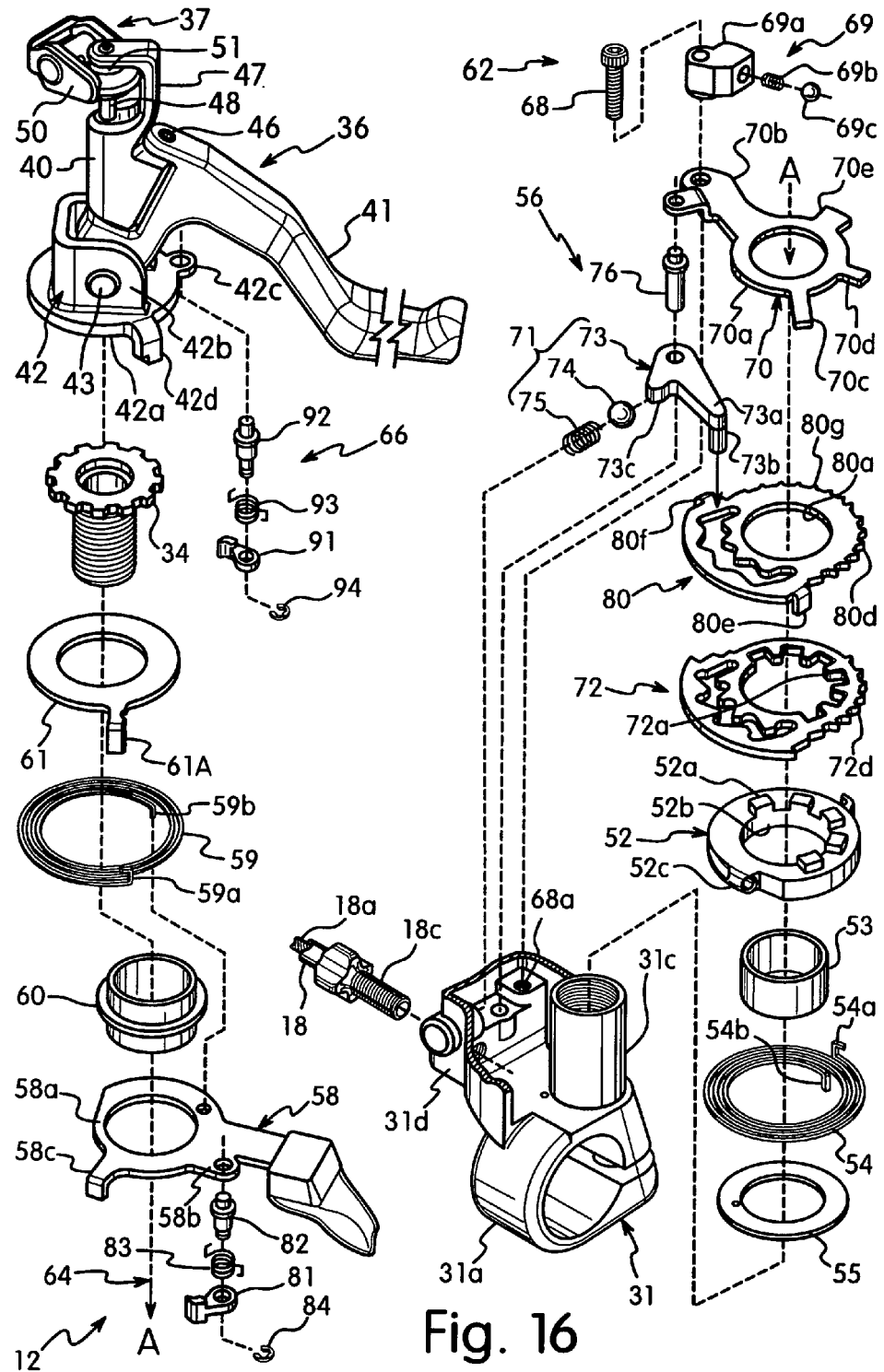
FIG. 16 is an exploded perspective view of the bicycle control device illustrated in FIGS. 1-15.
Figure 17:
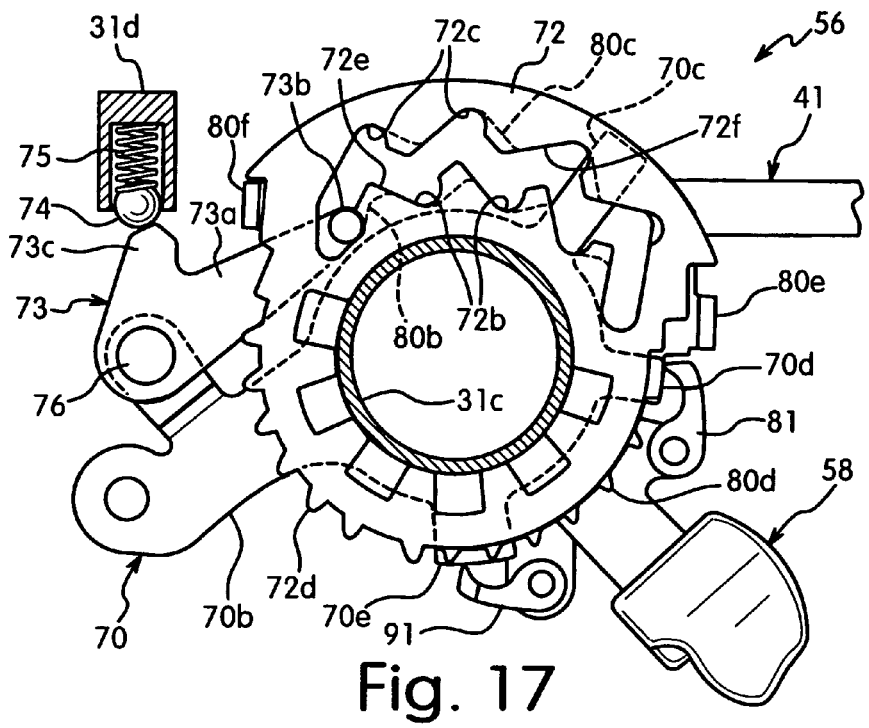
FIG. 17 is a simplified rear side elevational view of the shift position control mechanism for the bicycle control device illustrated in FIGS. 1-16 with the selected parts removed to show the main operating lever, the secondary operating (release) lever, the positioning plate and the cam releasing plate in their normal rest positions with the inner wire of the rear shift cable fully retracted on the wire takeup member.
Figure 18:
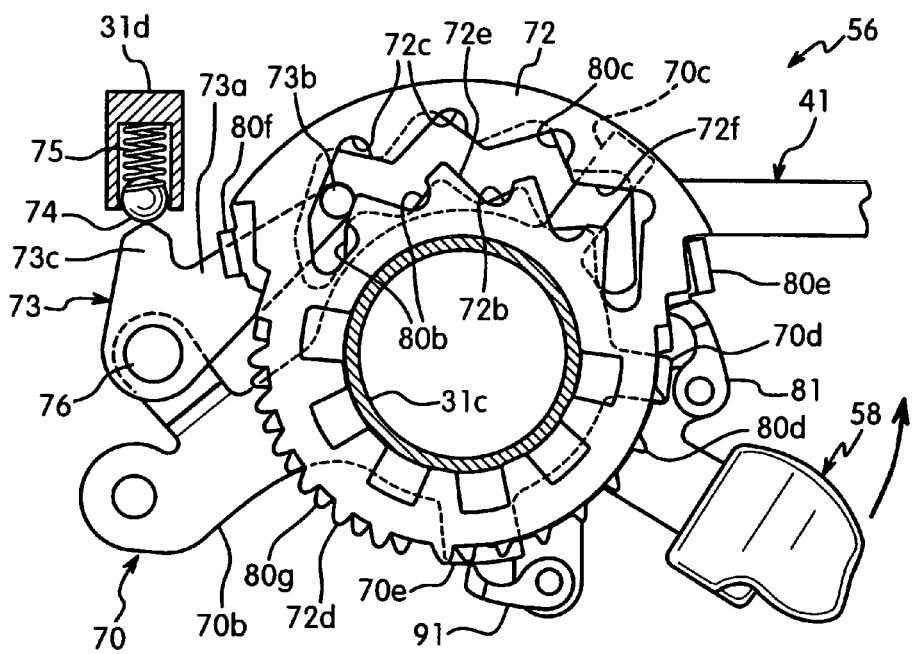
FIG. 18 is a simplified rear side elevational view of the shift position control mechanism for the bicycle control device, similar to FIG. 17, but with the secondary (release) lever being moved in a shift wire releasing direction such that the cam releasing plate is moved by the release pawl to move the detent member to a release position.
Figure 19:
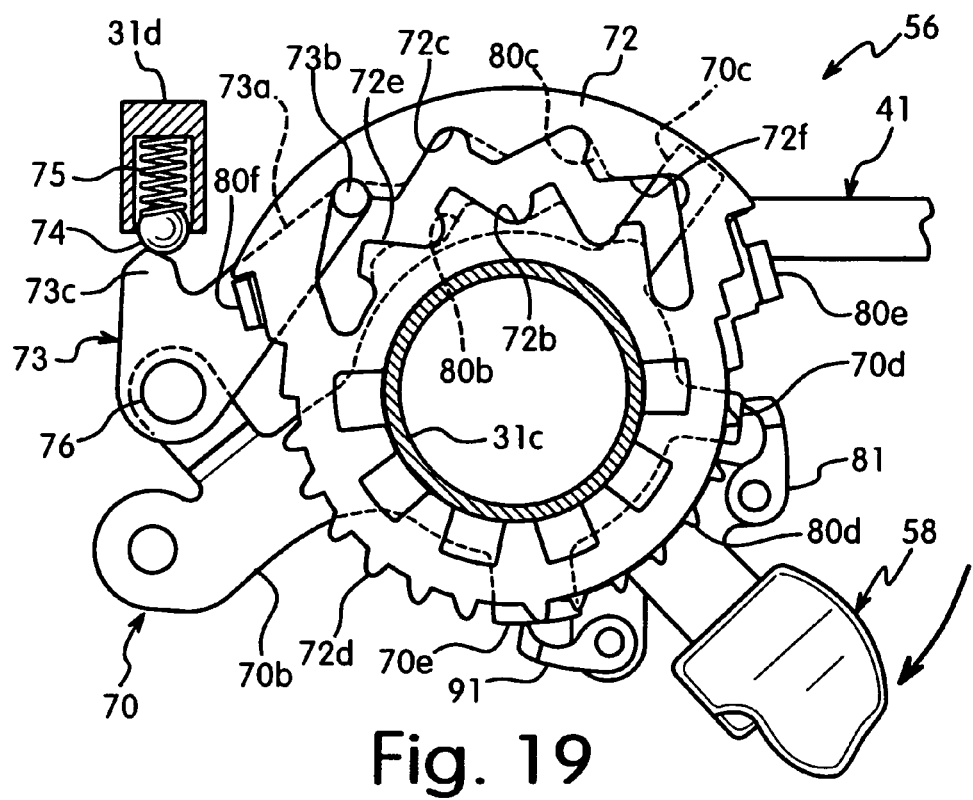
FIG. 19 is a simplified rear side elevational view of the shift position control mechanism for the bicycle control device, similar to FIGS. 17 and 18, but after the secondary (release) lever has been moved in a shift wire releasing direction resulting in the detent member being moved to the next shift position in the wire unwinding direction and then returned to the rest position.
Figure 20:
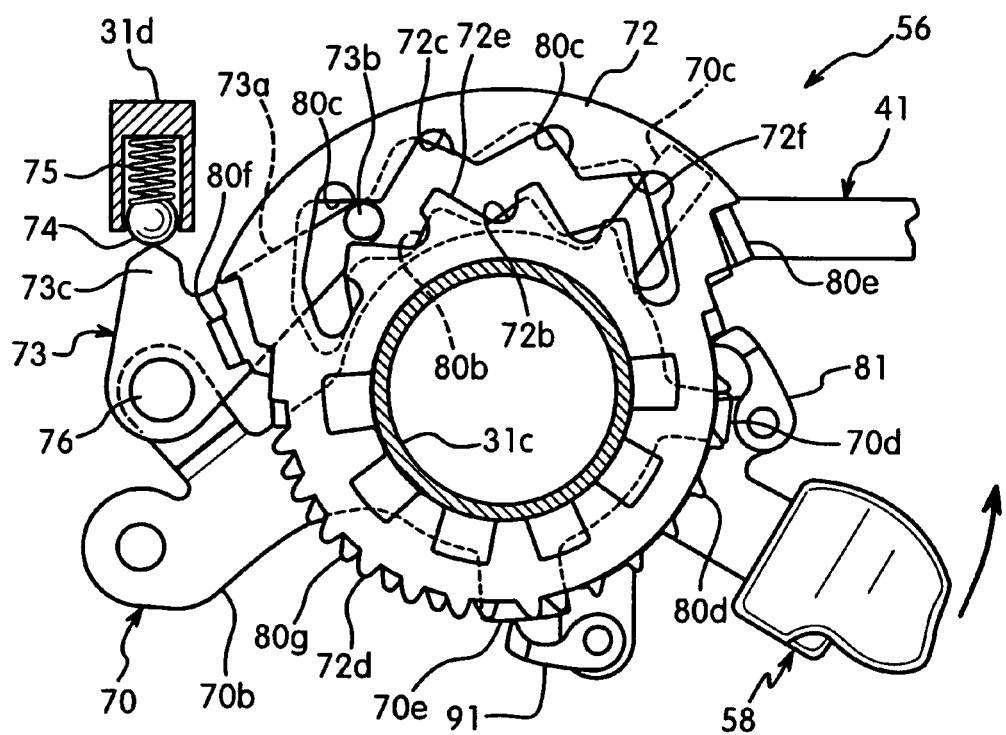
FIG. 20 is a simplified rear side elevational view of the shift position control mechanism for the bicycle control device, similar to FIGS. 17-19, but with the secondary (release) lever being moved in a shift wire releasing direction such that the cam releasing plate is moved by the release pawl to move the detent member to a release position.
Figure 21:
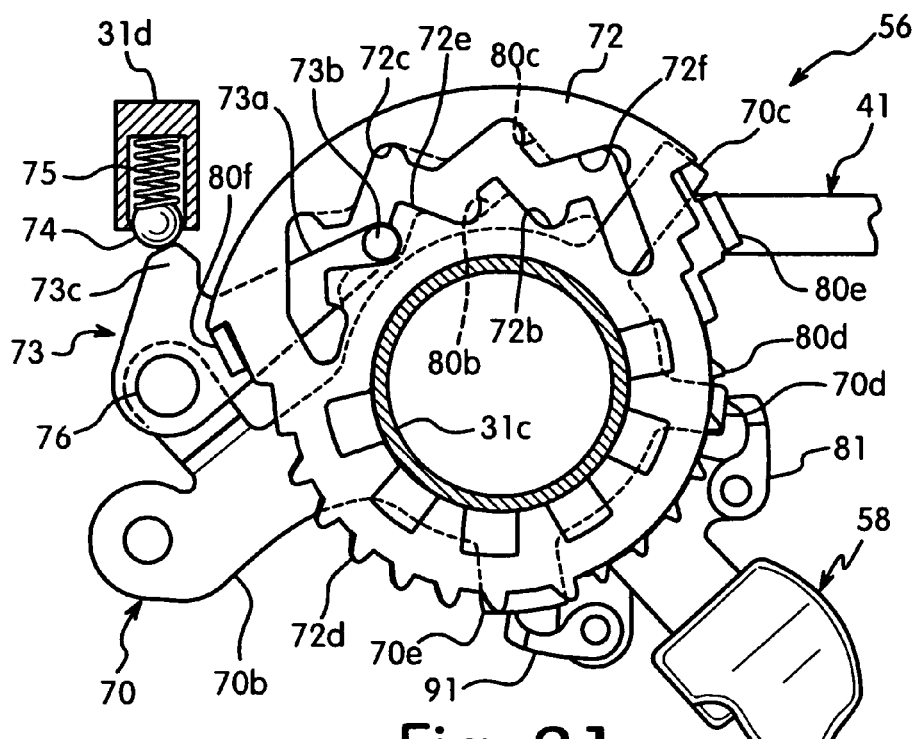
FIG. 21 is a simplified rear side elevational view of the shift position control mechanism for the bicycle control device, similar to FIGS. 17-20, but after the secondary (release) lever has been moved in a shift wire releasing direction resulting in the detent member being moved to the next shift position in the wire unwinding direction and then returned to the rest position.
Figure 22:
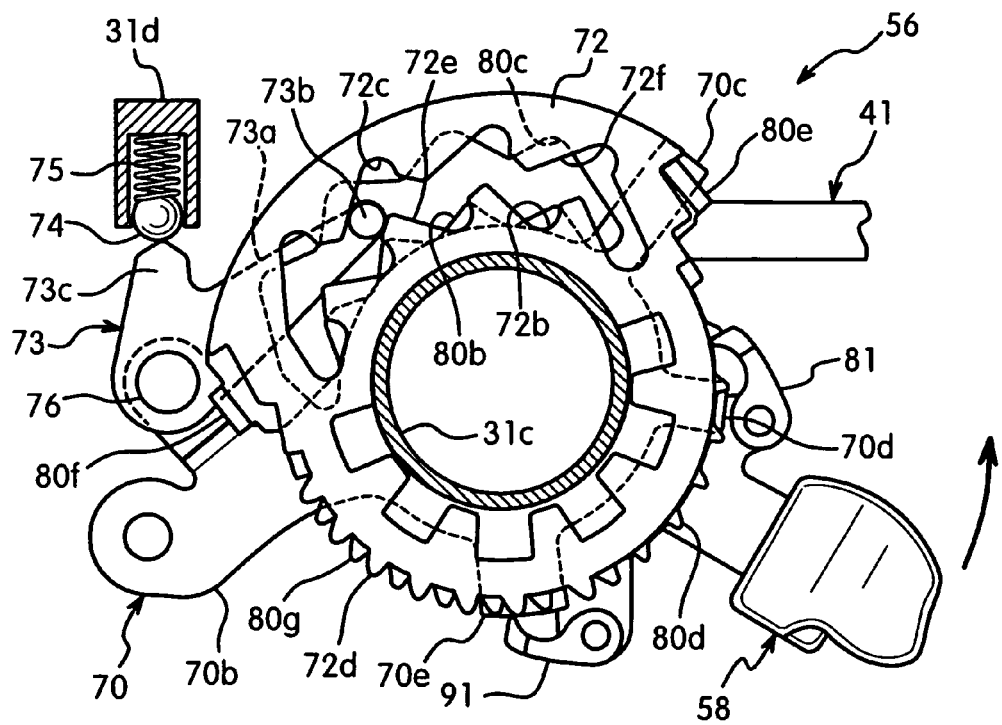
FIG. 22 is a simplified rear side elevational view of the shift position control mechanism for the bicycle control device, similar to FIGS. 17-21, but with the secondary (release) lever being moved in a shift wire releasing direction such that the cam releasing plate is moved by the release pawl to move the detent member to a release position.
Figure 23:
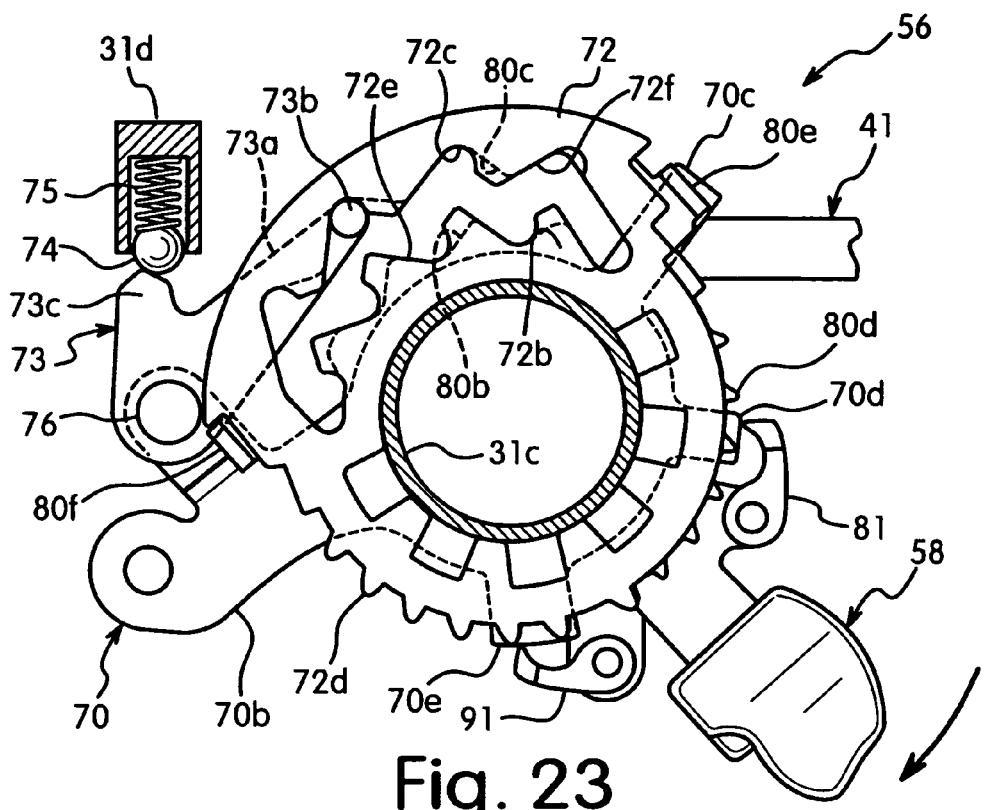
FIG. 23 is a simplified rear side elevational view of the shift position control mechanism for the bicycle control device, similar to FIGS. 17-22, but after the secondary (release) lever has been moved in a shift wire releasing direction resulting in the detent member being moved to the next shift position in the wire unwinding direction and then returned to the rest position.
Figure 24:
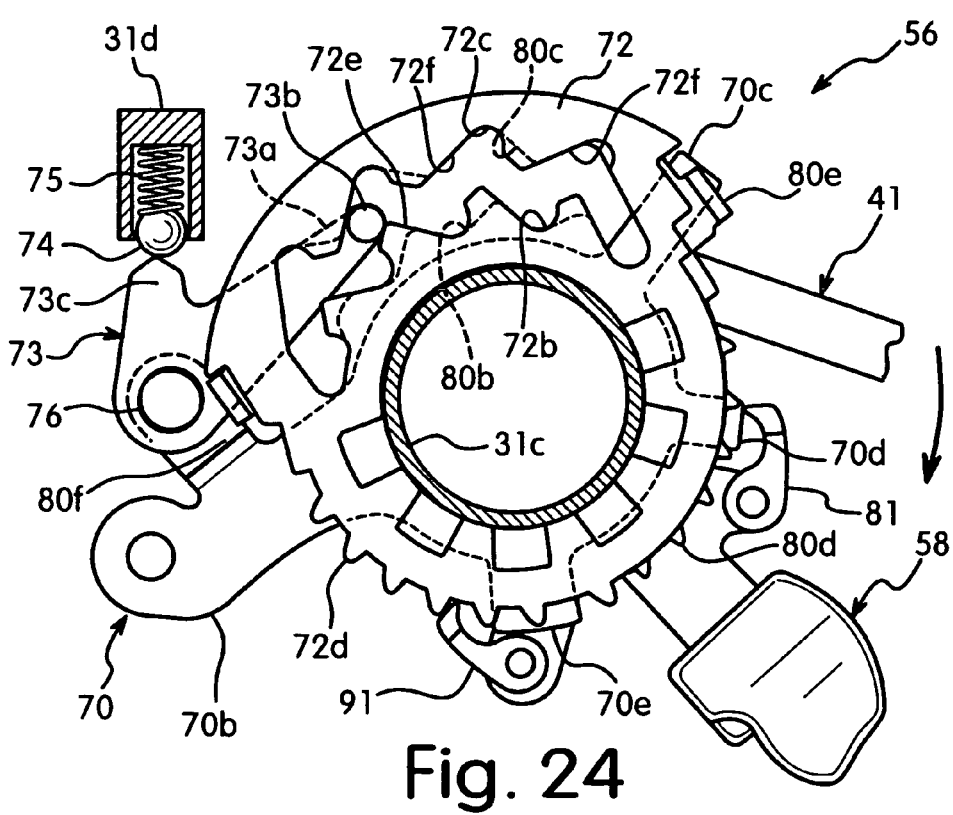
FIG. 24 is a simplified rear side elevational view of the shift position control mechanism for the bicycle control device, similar to FIGS. 17-23, but with the main operating lever being partially moved in a shift wire winding direction such that the positioning plate and the cam releasing plate are moved together by the positioning pawl to move the detent member to an intermediate position.
Figure 25:
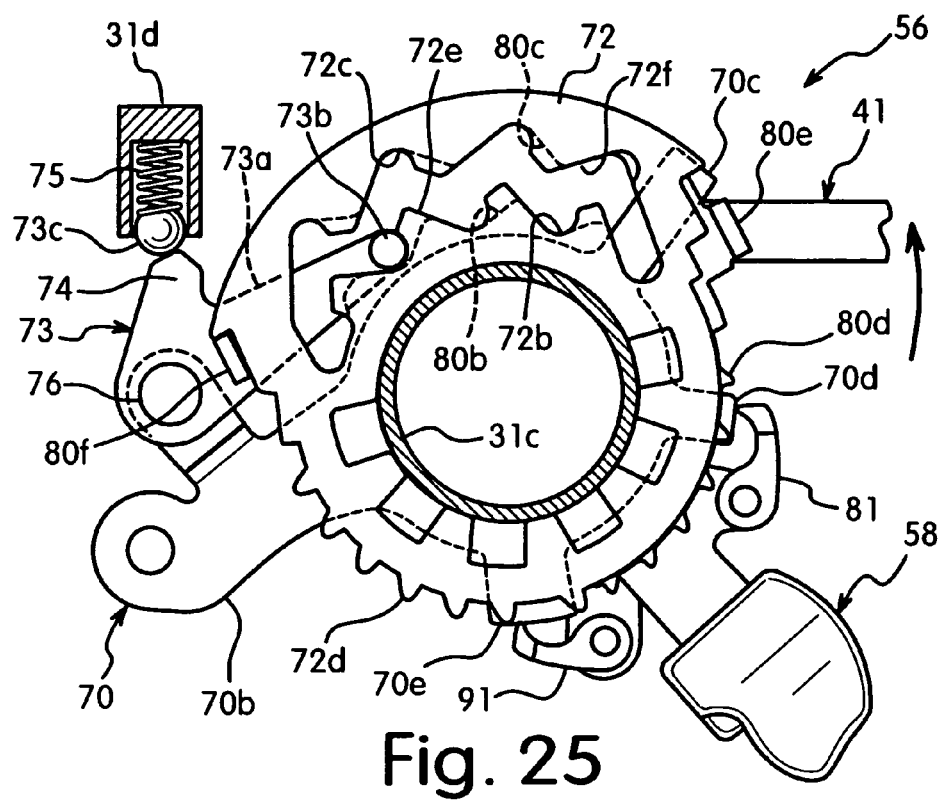
FIG. 25 is a simplified rear side elevational view of the shift position control mechanism for the bicycle control device, similar to FIGS. 17-24, but with the main operating lever being fully moved in a shift wire winding direction such that the positioning plate and the cam releasing plate are moved together by the positioning pawl to move the detent member to the next shift position.
Figure 26:
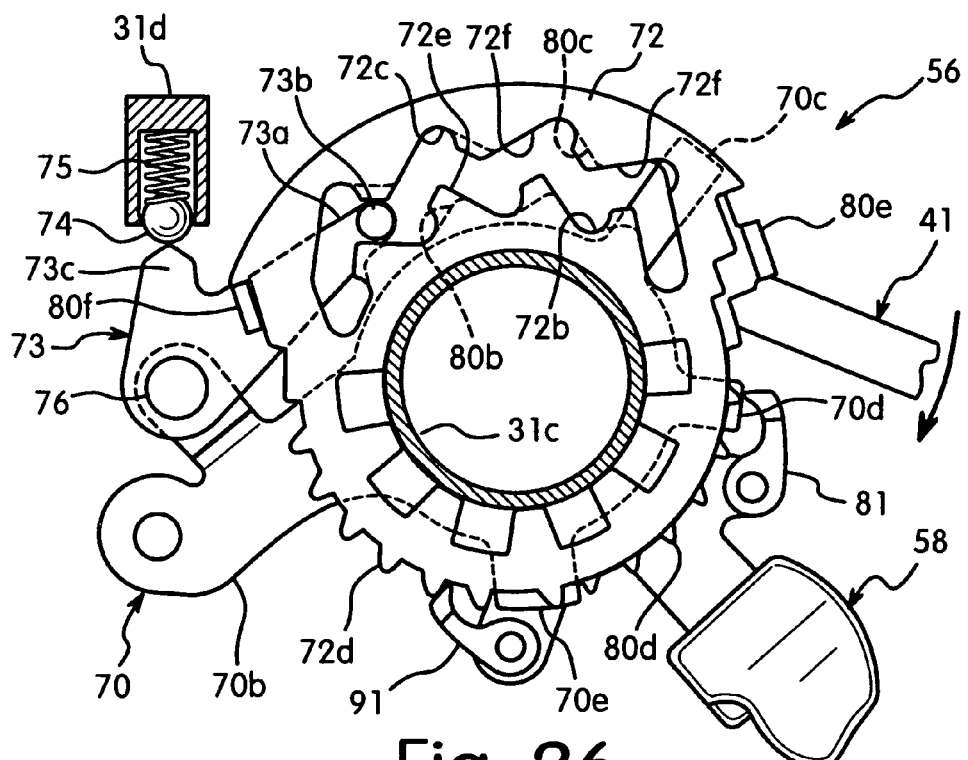
FIG. 26 is a simplified rear side elevational view of the shift position control mechanism for the bicycle control device, similar to FIGS. 17-25, but with the main operating lever being partially moved in a shift wire winding direction such that the positioning plate and the cam releasing plate are moved together by the positioning pawl to move the detent member to an intermediate position.
Figure 27:
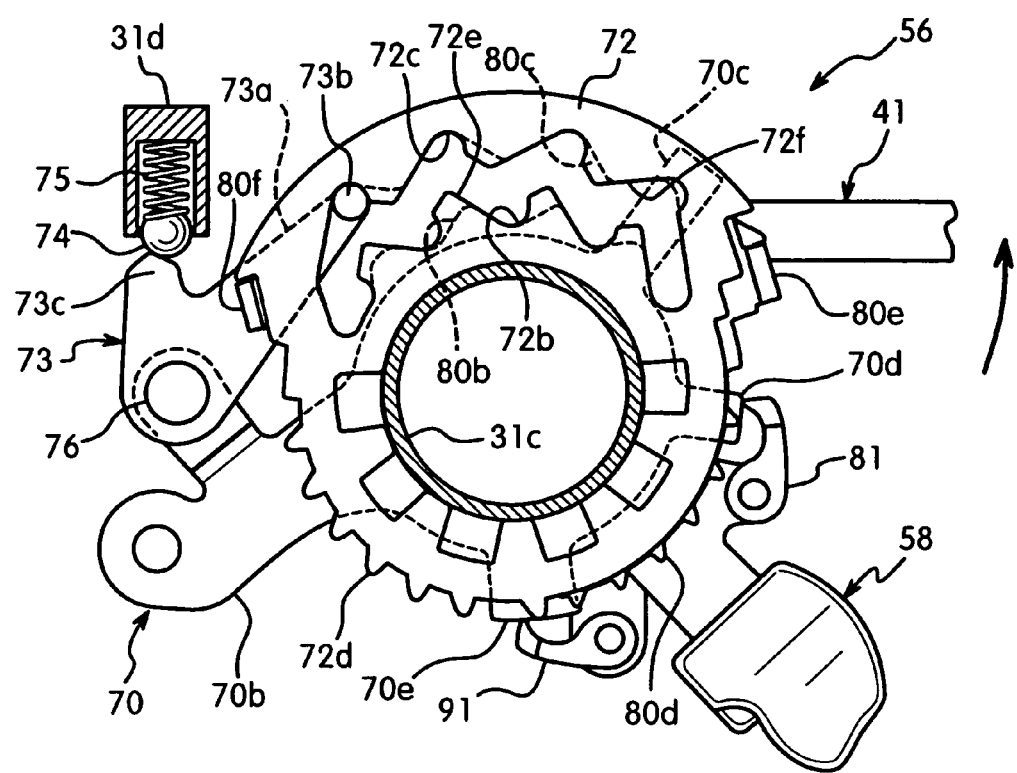
FIG. 27 is a simplified rear side elevational view of the shift position control mechanism for the bicycle control device, similar to FIGS. 17-26, but with the main operating lever being fully moved in a shift wire winding direction such that the positioning plate and the cam releasing plate are moved together by the positioning pawl to move the detent member to the next shift position.

As best seen in FIGS. 6, 7 and 16, the tubular shaft section 31c of the mounting portion 31 primarily supports the braking unit 32 and the shifting unit 33. The free end of the tubular shaft section 31c of the mounting portion 31 has internal threads for securing the shifting unit 33 to the mounting portion 31 by a nut 34. The braking unit 32 is attached to the nut 34 as discussed below.

Figure 3:
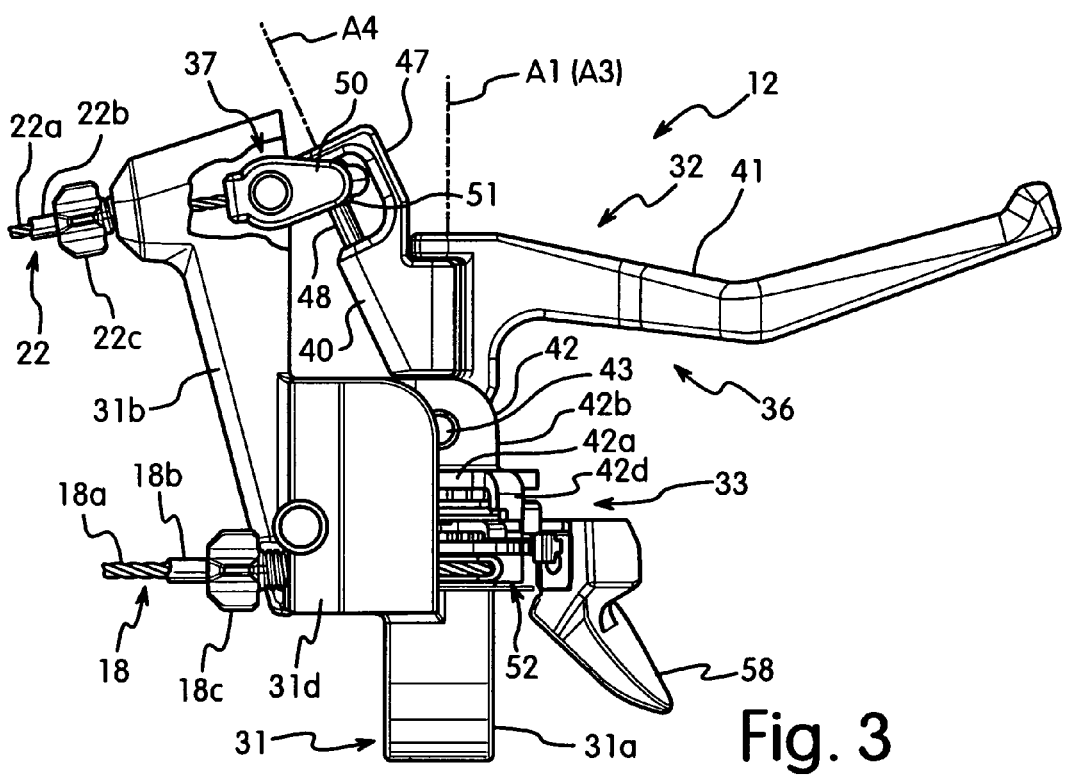
FIG. 3 is a top plan view of the bicycle control device illustrated in FIGS. 1 and 2, with the operating members in the rest position.

As best seen in FIGS. 3, 6 and 7, the braking unit 32 basically includes a main operating member 36 with a brake wire attachment member 37 coupled to the main operating member 36. The main operating member 36 is secured to the mounting portion 31 to rotate about a main shift operating axis A1 in response to the main operating member 36 being operated to perform a shifting operation. The brake wire attachment member 37 is secured to the main operating member 36 to move in response to the main operating member 36 being operated to perform a braking operation. However, the brake wire attachment member 37 is secured to the main operating member 36 such that the brake wire attachment member 37 remains substantially stationary when the main operating member 36 is operated to perform a shifting operation.

Thus, the main operating member 36 is a dual function operating member that functions as both a brake operating member and a main shift operating member. In other words, the main operating member 36 selectively operates both the braking unit 32 when pivoted in a first operating direction or plane and the shifting unit 33 when pivoted in a second operating direction or plane.

Preferably, the main operating member 36 includes a brake wire connecting part 40, a user engagement part or operating lever 41 and an attachment member 42. The user engagement part or lever 41 and the attachment member 42 are secured to the mounting portion 31 to rotate together about the main shift operating axis A1, while the user engagement part or lever 41 is pivotally attached to the attachment member 42 about a main brake operating axis A2 to pivot both the brake wire connecting part 40 and the user engagement part or lever 41 relative to the attachment member 42.

In particular, the user engagement part or lever 41 is pivotally mounted to the attachment member 42 by a pivot pin 43 that defines the main brake operating axis A2. Thus, the brake wire connecting part 40 and the user engagement part or lever 41 are configured and arranged to move along a braking path that is defined by a braking plane extending in a direction perpendicular to the brake operating axis A2 of the pivot pin 43. In other words, the pivot pin 43 is arranged such that the brake operating axis A2 of the pivot pin 43 extends in a direction perpendicular to the main shift operating axis A1 (the axis of the tubular shaft section 31c). The user engagement part or lever 41 and the attachment member 42 are configured and arranged to rotate together about the main shift operating axis A1 during the shifting operation, while the brake wire connecting part 40 remains substantially stationary during the shifting operation. Thus, the user engagement part or lever 41 is used as both a braking lever and a shifting lever with the brake operating axis A2 and the main shift operating axis A1 being angled relative to each other, e.g., to form a shifting path defined by a shifting plane that extends substantially perpendicular to the braking plane of the braking path.

As best seen in FIGS. 6 and 7, the main operating member 36 is mounted in a rotatable manner to the tubular shaft section 31c of the mounting portion 31 by the attachment member 42. The attachment member 42 is attached to the nut 34 by a screw 44 and a pair of bearing nuts 45 so that the attachment member 42 rotates relative to the nut 34 about the main shift operating axis A1.

As best seen in FIG. 16, the attachment member 42 has a rotating ring section 42a, a lever mounting section 42b, a winding pawl mounting flange 42c, and a stop flange 42d. Basically, the rotating ring section 42a is mounted to the tubular shaft section 31c of the mounting portion 31 and secured thereto by the screw 44. Thus, the attachment member 42 can be rotated about the main shift operating axis A1 by applying a generally upward force or a generally downward force to the free end of the user engagement part or lever 41.

The user engagement part or lever 41 is pivotally connected to the brake wire connecting part 40 by a pivot pin 46. The pivot pin 46 has a center (secondary) pivot axis A3 that is coincident with the main shift operating axis A1 when the user engagement part or lever 41 is in a rest position or non-braking position. Thus, when the user engagement part or lever 41 is moved up or down by the rider to perform a shifting operation, the user engagement part or lever 41 pivots about the center pivot axis A3 of the pivot pin 46, while the brake wire connecting part 40 remains substantially stationary due to tension from the inner wire 22a of the brake cable 22. However, when rider performs a braking operation, the user engagement part or lever 41 is pivoted on the pivot pin 43 and about the brake operating axis A2 such that movement of the user engagement part or lever 41 by the rider causes both the user engagement part or lever 41 and the brake wire connecting part 40 to move together relative to the attachment member 42. Of course, it is possible with the arrangement to perform both a shifting operation and a braking operation simultaneously as seen in FIGS. 12-15.

As best seen in FIGS. 6 and 7, the brake wire connecting part 40 includes a rigid support structure 47 that includes a support shaft 48. The rigid support structure 47 is pivotally mounted on the pivot pin 46 such that the brake wire connecting part 40 can pivot relative to the user engagement part or lever 41. In other words, the support structure 47 of the brake wire connecting part 40 can pivot relative to the user engagement part or lever 41 about the secondary pivot axis A3.

Figure 15:
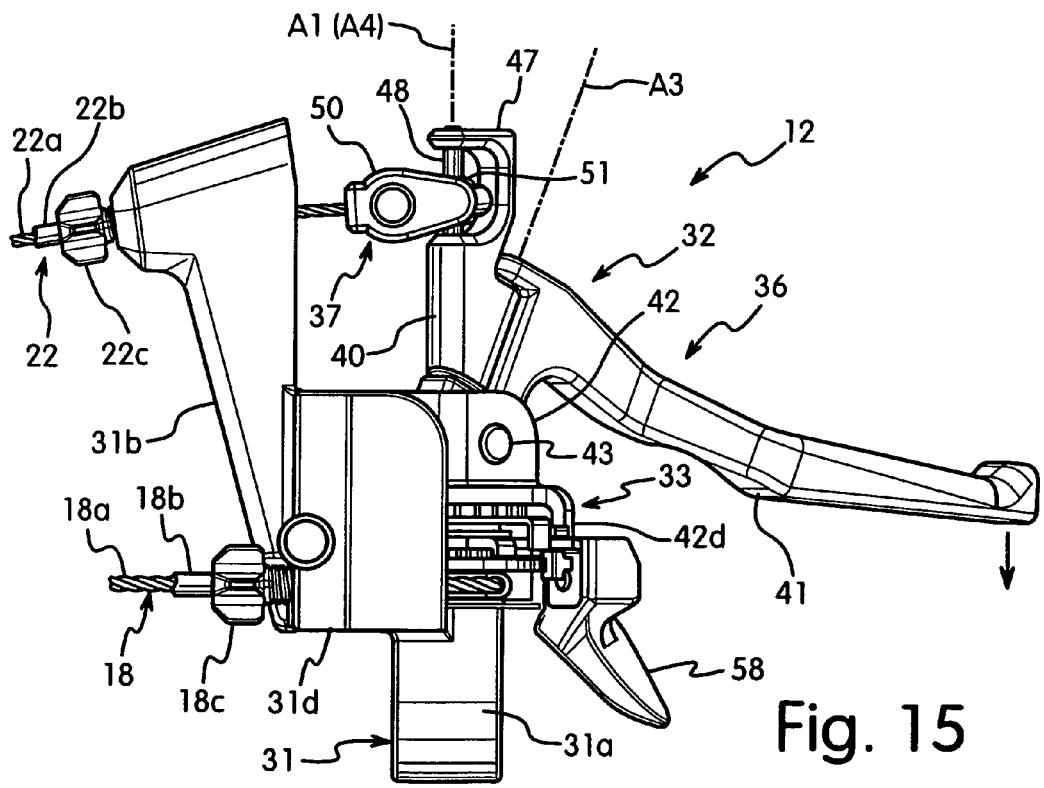
FIG. 15 is a top plan view of the bicycle control device illustrated in FIGS. 1-14, with the main operating member moved to the braking position and moved downwardly to a shifting position in which the shift wire is being wound on the wire takeup member.

The support shaft 48 movably supports the brake wire attachment member 37 along its center axis A4. The axis A4 of the support shaft 48 of the support structure 47 is arranged to form an acute angle with the main shift operating axis A1 of the main operating member 36 as well as with the secondary pivot axis A3 of the main operating member 36 when the operating member is in a non-braking position. When the main operating member 36 is pivoted to the braking position, the axis A4 of the support shaft 48 of the support structure 47 is arranged to be generally parallel to the main shift operating axis A1 of the main operating member 36 as seen in FIGS. 7 and 15. Preferably, the axis A4 of the support shaft 48 of the support structure 47 is coincident or nearly coincident to the main shift operating axis A1 of the main operating member 36 when the user engagement part or lever 41 of the of the main operating member 36 is in the braking position.

As best seen in FIGS. 6 and 7, the brake wire attachment member 37 movably couples the inner wire 22a of the brake cable 22 to the support shaft 48 of the support structure of the brake wire connecting part 40. In particular, the brake wire attachment member 37 basically includes a wire connector 50 and a universal coupling 51 as best seen in FIGS. 6 and 7. The wire connector 50 is attached to the inner wire 22a of the brake cable 22, while the universal coupling 51 movably couples the wire connector 50 to the support shaft 48 of the support structure 47. Thus, the brake wire attachment member 37 is slideably and rotatably mounted along the support shaft 48 of the support structure 47 by the universal coupling 51.

The universal coupling 51 provides at least two degrees of angular movement between the wire connector 50 and the support shaft 48. In particular, the universal coupling 51 is configured and arranged to slide longitudinal along the support shaft 48 and rotate about a center axis A3 of the support shaft 48. Moreover, the universal coupling 51 preferably forms a ball joint with the wire connector 50 in that the universal coupling 51 has a spherical (ball shaped) outer surface that is disposed in a partially spherical (socket) inner surface of the wire connector 50 such that the wire connector 50 can rotate on the spherical outer surface of the universal coupling 51 in all directions.

Now, the shifting unit 33, which is coupled to the bicycle mounting portion 31 and configured to selectively move between a plurality of shift positions, will be discussed. As best seen in FIG. 16, the shifting unit 33 is basically mounted around the center cylinder axis of the tubular shaft section 31c to provide a compact structure. Moreover, with this arrangement, the user engagement part or lever 41 also acts as a main shift lever of the shifting unit 33 as explained below. Thus, the shifting unit 33 basically includes the main operating member 36, discussed above, as well as a wire takeup member 52, a wire takeup biasing member or spring 54, a shift wire position control mechanism 56 and a secondary operating member or lever 58. This arrangement of the shifting unit 33 allows the rider to shift the rear gears up or down regardless of the rider's hand position on the handlebar 14. As explained below, the user engagement part or lever 41 and the secondary operating lever 58 are operatively connected to the wire takeup member 52 by the shift wire position control mechanism 56 to selectively wind or release the inner wire 18a. Both the user engagement part or lever 41 and the secondary operating lever 58 are configured as trigger type of levers that spring back to a rest position after being operated to the shift position.

The user engagement part or lever 41 of the main operating member 36 is configured and arranged to act as a winding lever and a release lever. In other words, the main operating member 36 is operatively coupled to the wire takeup member 52 to perform an upshifting operation when moved in a first direction from a rest position and a downshifting operation when moved in a second direction from the rest position. In other words, the main operating member 36 is configured and arranged to perform both upshifting and downshifting, e.g., pulling (winding) and releasing (unwinding). Thus, the user engagement part or lever 41 can be pivoted in a first direction to rotate the wire takeup member 52 in a winding direction and pivoted in a second direction to rotate the wire takeup member 52 in a release direction. The secondary operating lever 58, on the other hand, is configured and arranged to act solely as a release lever. The secondary operating lever 58 is also configured and arranged to move along the shifting path or plane about the shifting axis that is coincident with or parallel to the center axis of the tubular shaft section 31c to perform a shifting operation. However, the secondary operating lever 58 is only configured to release the inner wire 18a.

As best seen in FIG. 16, the user engagement part or lever 41 and the secondary operating lever 58 are maintained in their rest position by a lever returning arrangement that includes a biasing member 59, a spacer member or washer 60 and a pushing washer 61. The biasing member 59 is preferably a torsion spring with a first end 59a contacting a tab 61a of the pushing washer 61 which in turn pushes the attachment member 42 that is connected to the user engagement part or lever 41. The biasing member 59 has a second end 59b disposed in a hole formed in the secondary operating lever 58. Accordingly, the user engagement part or lever 41 is biased in an opposite rotational direction from the secondary operating lever 58. The spacer member or washer 60 is configured and arranged to maintain the proper axial spacing between the user engagement part or lever 41 and the secondary operating lever 58 so that the biasing member 59 is not axially squeezed therebetween.

When either the user engagement part or lever 41 or the secondary operating lever 58 is moved in a generally upward direction, a downshifting or an upshifting operation is performed depending on the configuration of the rear derailleur 16. When the user engagement part or lever 41 is moved by the rider in a generally upward direction, the secondary operating lever 58 is moved therewith in a generally upward direction. However, the secondary operating lever 58 is moved by the rider in a generally upward direction, the user engagement part or lever 41 remains stationary.

As seen in FIGS. 17-29, the wire unwinding operation is illustrated in which a downshifting or an upshifting operation is performed depending on the configuration of the rear derailleur 16. While FIGS. 17-23 illustrates the secondary operating lever 58 being operated, the same movements occur when the user engagement part or lever 41 is moved in the same (wire unwinding) direction of the secondary operating lever 58 as seen in FIGS. 17-23. Thus, when either the rider pushes the user engagement part or lever 41 or the secondary operating lever 58 generally in an upward direction, the inner wire 18a is released to unwind the inner wire 18a from the outer peripheral edge of the wire takeup member 52. This inner wire releasing movement of the inner wire 18a operates the rear derailleur 16 to move the chain in a lateral direction relative to the center plane of the bicycle 10, such that the chain moves from one gear or sprocket to the next gear or a sprocket. The secondary operating lever 58 includes a ring portion 58a, a pawl mounting tab 58b and a stop tab 58c.

On the other hand, as seen in FIGS. 24-27, the user engagement part or lever 41 of the main operating member 36 is pushed generally in a downward direction to perform either a downshifting operation or an upshifting operation depending on the configuration of the derailleur being operated. When the rider pushes the user engagement part or lever 41 generally in a downward direction, the inner wire 18a is pulled to wind the inner wire 18a on the outer peripheral edge of the wire takeup member 52. This inner wire pulling movement of the inner wire 18a operates the rear derailleur 16 to move the chain in a lateral direction relative to the center plane of the bicycle 10, such that the chain moves from one gear or sprocket to the next gear or sprocket.

Figure 8:
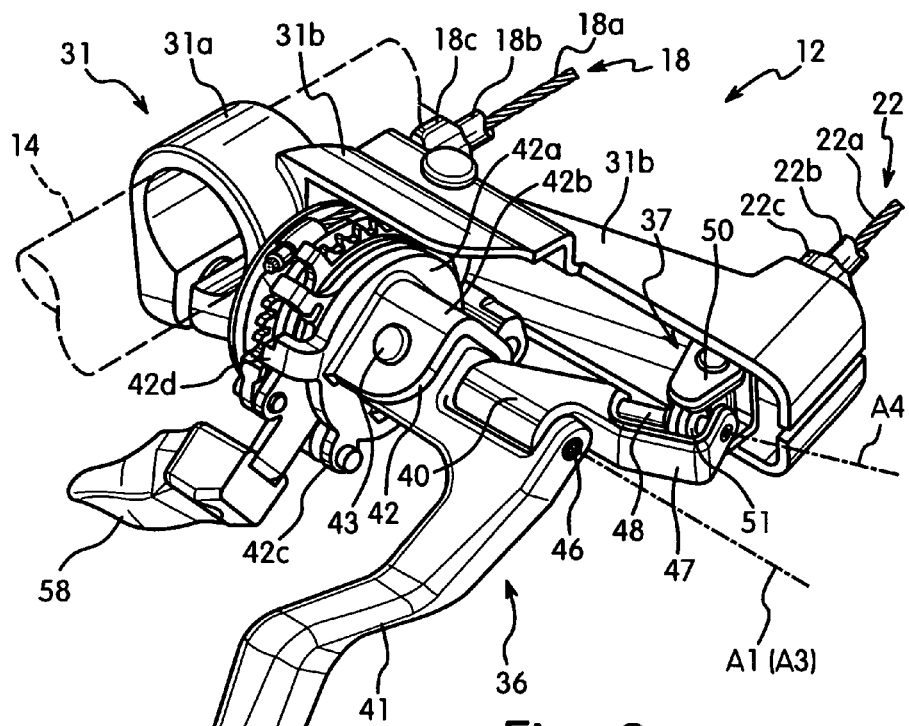
FIG. 8 is a top perspective view of the bicycle control device illustrated in FIGS. 1-7, with the main operating member being moved downwardly to a shifting position in which the shift wire is being wound on the wire takeup member.
Figure 9:
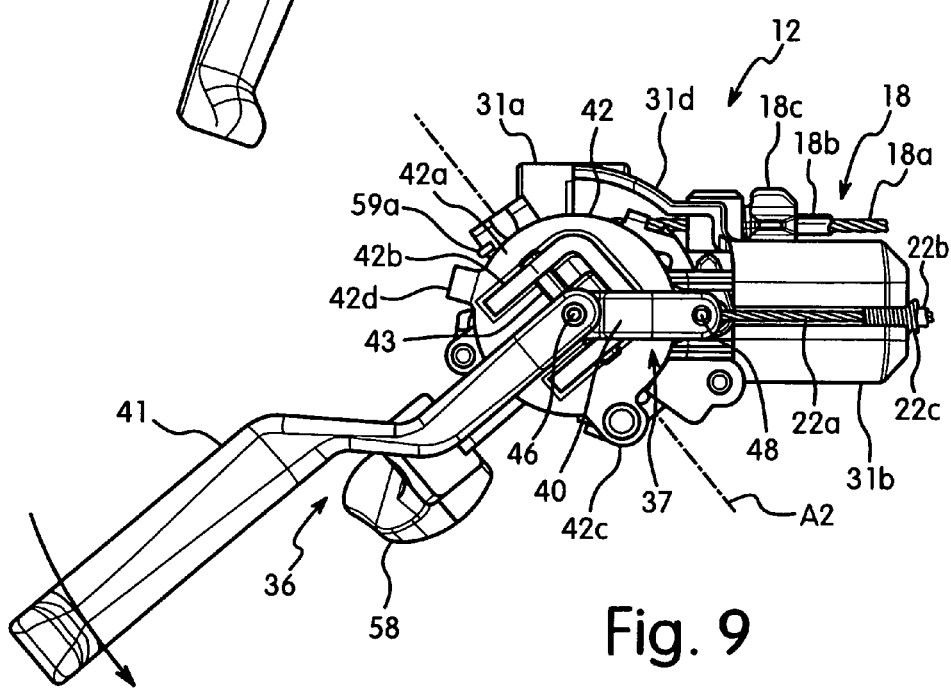
FIG. 9 is a front side elevational view of the bicycle control device illustrated in FIGS. 1-8, with the main operating member being moved downwardly to a shifting position in which the shift wire is being wound on the wire takeup member.
Figure 10:
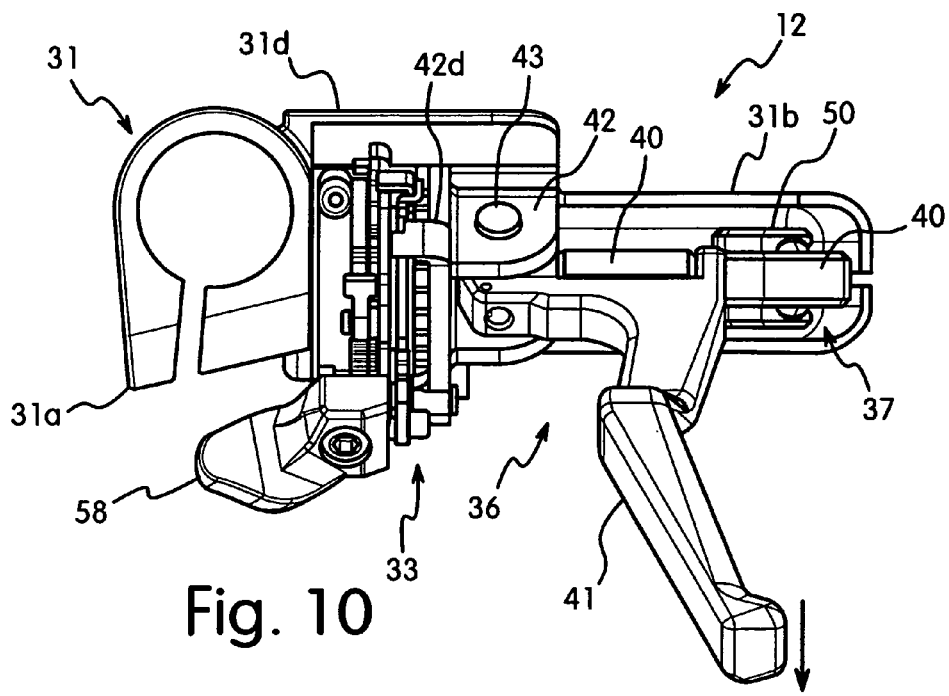
FIG. 10 is an outer side elevational view of the bicycle control device illustrated in FIGS. 1-9, with the main operating member being moved downwardly to a shifting position in which the shift wire is being wound on the wire takeup member.
Figure 11:
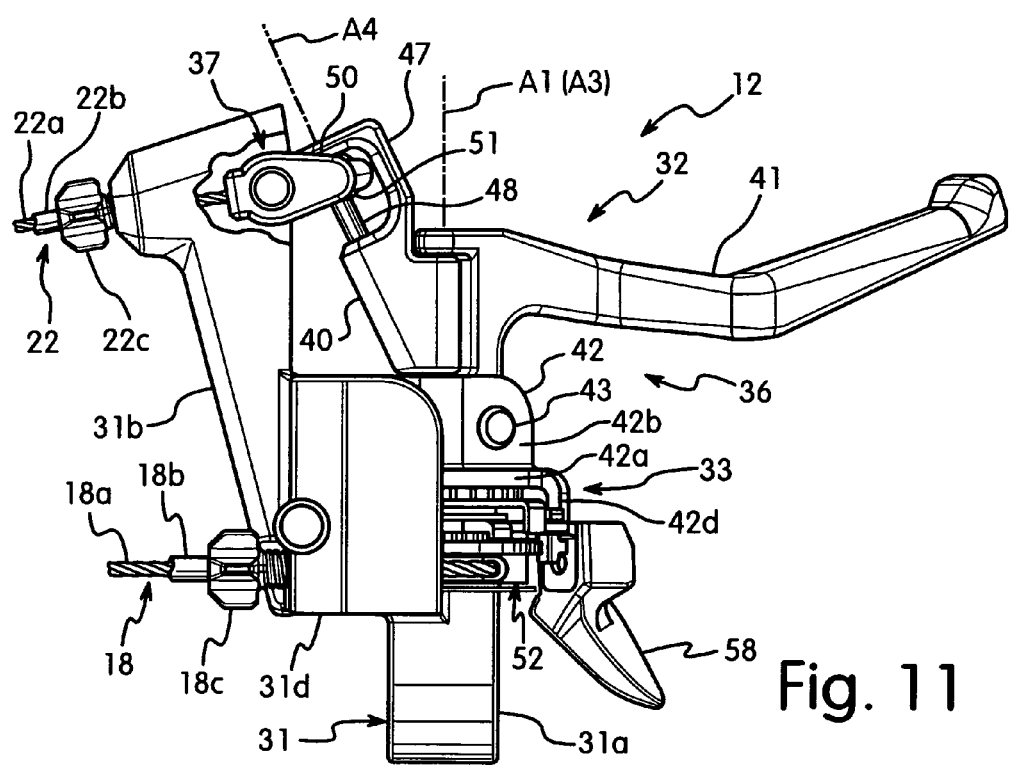
FIG. 11 is a top plan view of the bicycle control device illustrated in FIGS. 1-10, with the main operating member being moved downwardly to a shifting position in which the shift wire is being wound on the wire takeup member.
Figure 12:
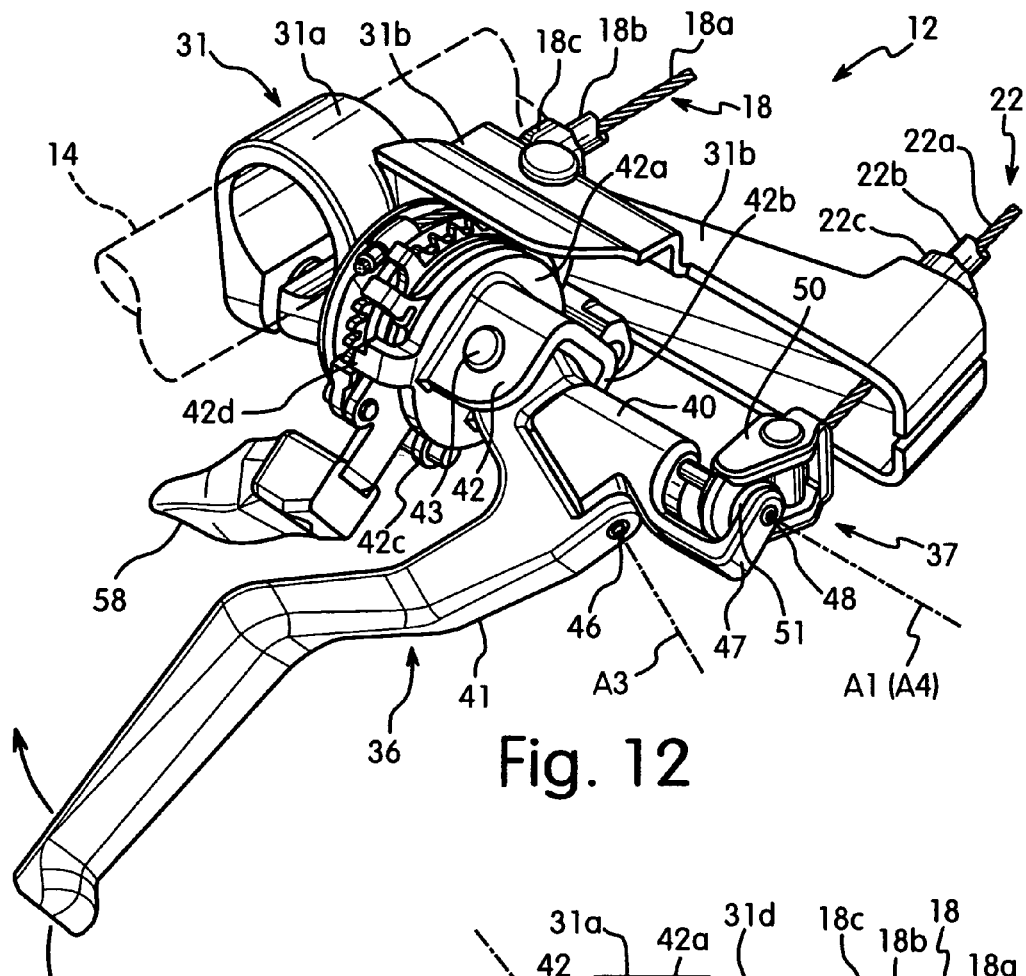
FIG. 12 is a top perspective view of the bicycle control device illustrated in FIGS. 1-11, with the main operating member moved to the braking position and moved downwardly to a shifting position in which the shift wire is being wound on the wire takeup member.
Figure 13:
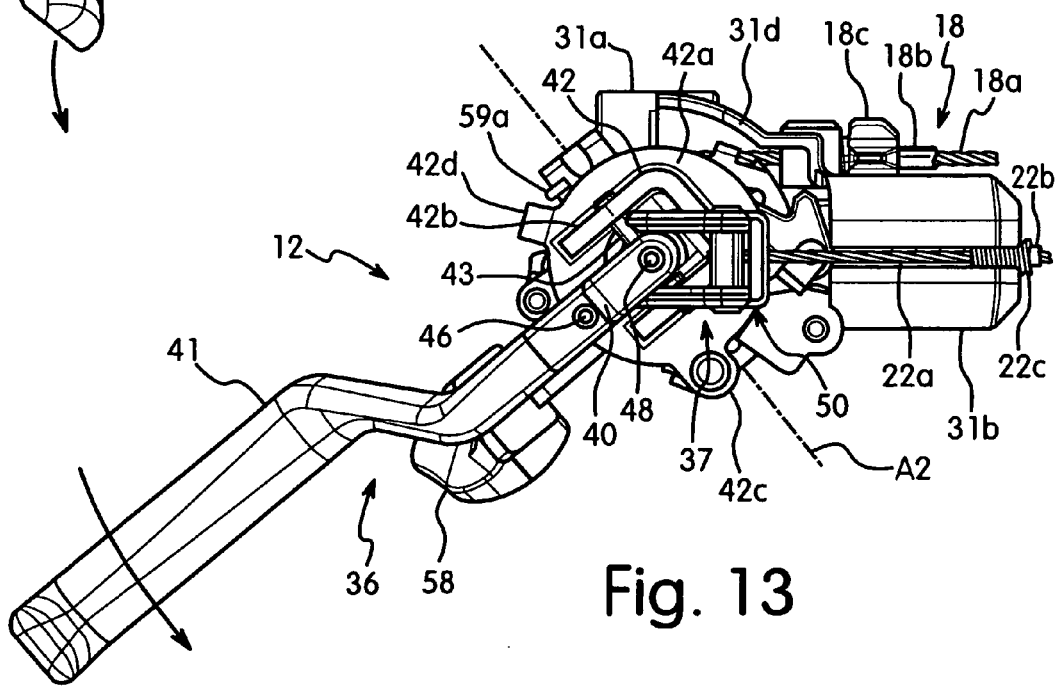
FIG. 13 is a front side elevational view of the bicycle control device illustrated in FIGS. 1-12, with the main operating member moved to the braking position and moved downwardly to a shifting position in which the shift wire is being wound on the wire takeup member.
Figure 14:
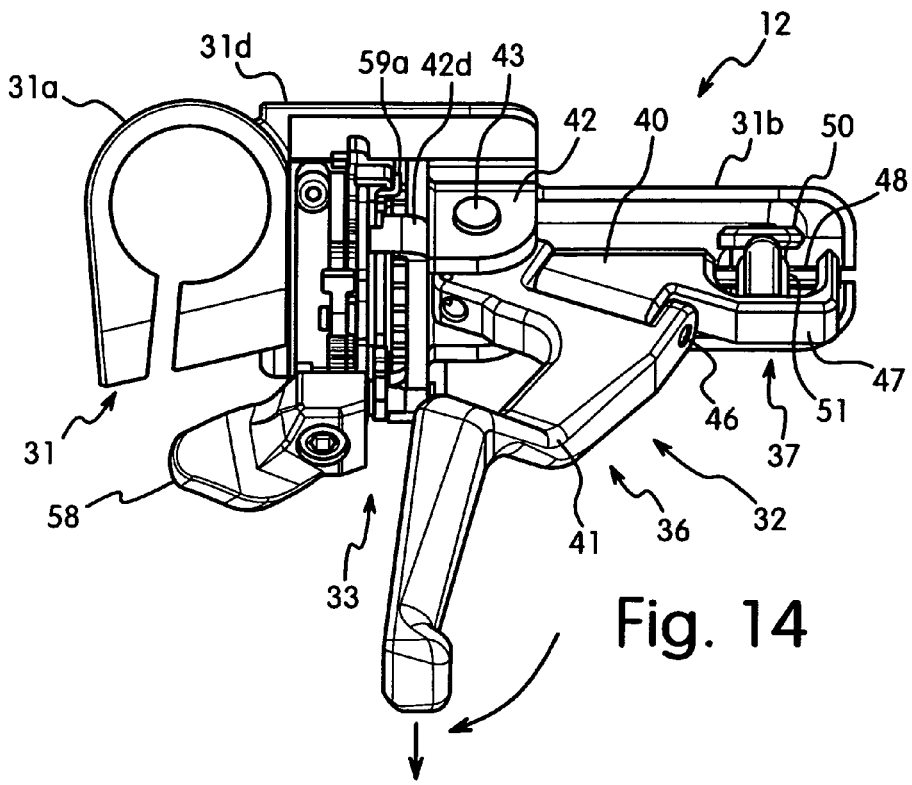
FIG. 14 is an outer side elevational view of the bicycle control device illustrated in FIGS. 1-13, with the main operating member moved to the braking position and moved downwardly to a shifting position in which the shift wire is being wound on the wire takeup member.

As best seen in FIG. 8, the wire takeup member 52 is a one piece unitary member made from a hard, rigid plastic material. The wire takeup member 52 is basically a ring shaped member that is rotatably mounted around the master cylinder (the tubular shaft section 31c) such that the wire takeup member 52 has its center pivot axis coinciding with the center cylinder axis of the master cylinder (the tubular shaft section 31c). The wire takeup member 52 is preferably mounted on the tubular shaft section 31c of the mounting portion 31 with a tubular washer 53 disposed therebetween. The tubular washer 53 is configured and arranged to maintain the proper axial spacing between the wire takeup member 52, the wire takeup biasing member 54, the parts of the shift wire position control mechanism 56 and the secondary operating member or lever 58. In particular, the tubular washer 53 has a first end that contacts a spring supporting ring 55, and a second end that contacts a portion of the shift wire position control mechanism 56 such that the parts can freely rotate on the tubular shaft section 31c of the mounting portion 31.

As best seen in FIG. 16, the wire takeup member 52 has a plurality of projections 52a that surround a center opening 52b and a cable attachment point 52c located on its peripheral surface. The inner wire 18a of the rear shift cable 18 is attached at one to the cable attachment point 52c and at the other end to the rear derailleur 16. Thus, the inner wire 18a is wound around the periphery of the wire takeup member 52 when the inner wire 18a is being pulled, as seen in FIGS. 8-15, to operate the rear derailleur 16.

Figure 4:
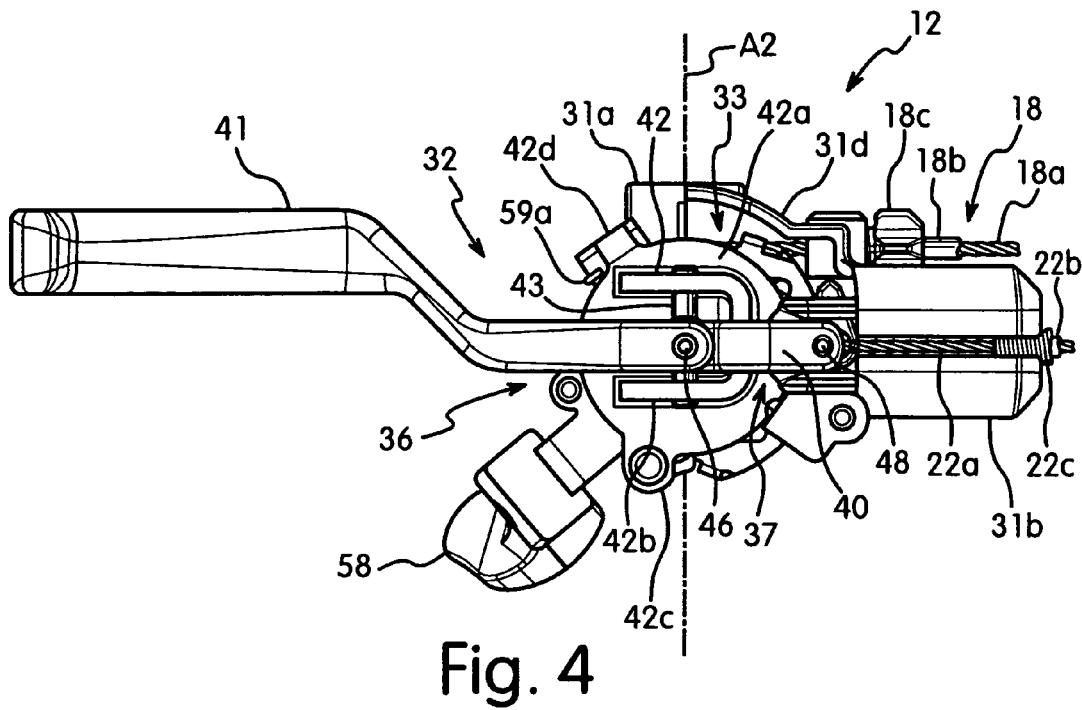
FIG. 4 is a front side elevational view of the bicycle control device illustrated in FIGS. 1-3, with the operating members in the rest position.

As best seen in FIGS. 2, 4 and 16, the wire takeup biasing member 54 is a coiled torsion spring that has one end 54a coupled to a hook of the wire takeup member 52 and a second end 54b located in a hole formed in the main support 38 that forms the housing of the reservoir. Thus, the wire takeup member 52 is biased in a first rotational direction about the rotational shift axis that is coincident with the center cylinder axis of the tubular shaft section 31c. As viewed in FIGS. 17-27, the wire takeup biasing member 54 urges the wire takeup member 52 in a counter-clockwise about rotational shift axis, i.e. a shift wire unwinding direction. When the bicycle control device 12 is in the normal rest position, the wire takeup member 52 is preloaded to maintain the shift position.

Still referring to FIGS. 7 and 8, the shift position control mechanism 56 is mounted around the tubular shaft section 31c for controlling the position of the wire takeup member 52 and thus, controlling the shift position of the rear derailleur 16 by pulling and releasing the inner wire 18a of the rear shift cable 18. Preferably, the shift position control mechanism 56 includes a shift position maintaining mechanism 62, a shift position releasing mechanism 64 and a shift position winding mechanism 66. The shift position releasing mechanism 64 is operatively coupled to the shift position control mechanism 56 such that the wire takeup member 52 is rotated in the wire unwinding direction. The shift position winding mechanism 66 is operatively coupled to the shift position control mechanism 56 such that the wire takeup member 52 is rotated in the winding direction.

Preferably, as seen in FIG. 16, the shift position maintaining mechanism 62 basically includes a mounting bolt 68, a main operating lever maintaining structure 69, a mounting/control member or plate 70, a positioning detent structure 71 and a shift positioning member or plate 72.

The mounting bolt 68 is secured to the positioning control mounting section 31d of the mounting portion 31. In particular, the mounting bolt 68 is threaded into a hole 68a of the positioning control mounting section 31d of the mounting portion 31. The mounting bolt 68 secures the main operating lever maintaining structure 69, the mounting/control member or plate and the positioning detent structure 71 to the positioning control mounting section 31d of the mounting portion 31.

As seen in FIG. 16, the main operating lever maintaining structure 69 basically includes a block 69a, a compression spring 69b, and a lever engaging ball 69c. The compression spring 69b, and the position retaining ball 69c are disposed in a bore of the block 69a such that the position retaining ball 69c is biased against the peripheral edge of the rotating ring section 42a of the attachment member 42. Preferably, the peripheral edge of the rotating ring section 42a of the attachment member 42 has a notch that the position retaining ball 69c engages when the user engagement part or lever 41 and the secondary operating lever 58 are both in their rest positions.

As best seen in FIG. 16, the mounting/control member or plate 70 basically includes a stationary ring section 70a, a mounting arm 70b, a release lever stop tab 70c, a release pawl disengagement tab 70d, and a winding pawl disengagement tab 70e. The stationary ring section 70a is mounted around the tubular shaft section 31c, while the mounting arm 70b is secured to the positioning control mounting section 31d by the mounting bolt 68. The mounting arm 70b of the mounting/control member or plate 70 also retains the positioning detent structure 71 on the positioning control mounting section 31d. One end of the biasing member 59 is located in a hole in the ring portion 58a such that the stop tab 58c is normally biased against the release lever stop tab 70c such that the secondary operating lever 58 is maintained in the rest position.

Still referring to FIG. 16, the positioning detent structure 71 basically includes a positioning detent member 73, a position retaining ball 74 and a compression spring 75. The detent member 73, the position retaining ball 74 and the compression spring 75 are configured and arranged to form a toggle structure such that the detent member 73 is selectively retained in two distinct engagement positions (e.g., see FIGS. 17 and 19) by the position retaining ball 74. Thus, the detent member 73 is a position maintaining member that is selectively biased in a first direction when in a first engagement position and biased in a second direction when in a second engagement position.

Figure 28:
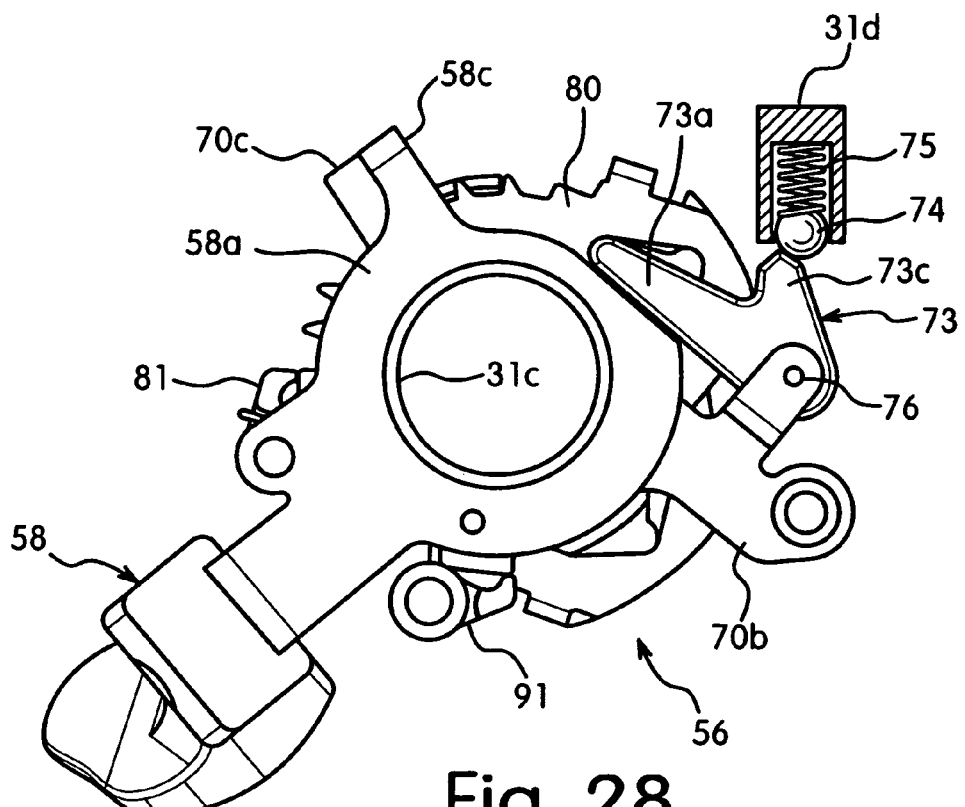
FIG. 28 is a simplified front side elevational view (opposite side from FIGS. 17-27) of the shift position control mechanism for the bicycle control device with the selected parts removed.
Figure 29:
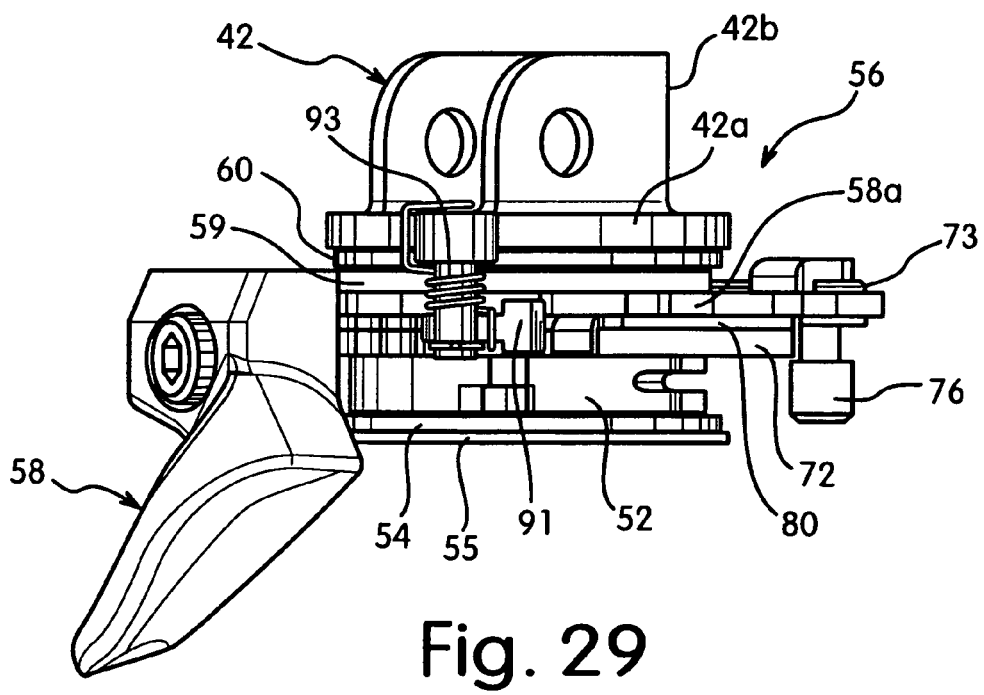
FIG. 29 is a simplified bottom plan view of the portions of the shift position control mechanism illustrated in FIG. 28.

The rotational movement of the shift positioning member or plate 72 causes the detent member 73 to rock (toggle) back and forth against the force of the compression spring 75 on the position retaining ball 74. As best seen in FIGS. 28-30, the detent member 73 includes a control arm 73a with a detent pin 73b and a cam arm 73c with a pair of cam surfaces. The detent member 73 is pivotally coupled to the positioning control mounting section 31d by a pivot pin 76 that is retained between the mounting/control member or plate 70 and the positioning control mounting section 31d. The detent member 73 is selectively retained in the two distinct positions (e.g., see FIGS. 17 and 19) by the position retaining ball 74 selectively engaging the cam surfaces at the free end of the cam arm 73c in response to the rotational movement of the shift positioning plate 72. In particular, the detent member 73 is pivoted by the rotational movement of the shift positioning plate 72, which is rotated by the shift position releasing mechanism 64 in the wire unwinding direction and the shift position winding mechanism 66 in the winding direction. This pivotal movement of the detent member 73 causes the cam arm 73c to move the position retaining ball 74 against the force of the compression spring 75. As the position retaining ball 74 switches from one of the cam surfaces at the free end of the cam arm 73c to the other of the cam surfaces of the cam arm 73c, the position retaining ball 74 biases the detent member 73 from one of the two distinct positions to the other of the two distinct positions (e.g., see FIGS. 17 and 19). Accordingly, the detent member 73 is toggled back and forth as the shift position control mechanism 56 from one shift position to the next shift position as seen in FIGS. 17-27.

As best seen in FIGS. 30-32, the shift positioning member or plate 72 basically includes a center opening 72a, a first toothed segment with a plurality of first (inner) recesses 72b defining a first set of the shift positions, a second toothed segment with a plurality of second (outer) recesses 72c defining a second set of the shift positions, and a set of winding ratchet teeth 72d. The first (inner) recesses 72b and the second (outer) recesses 72c constitute position retaining recesses. The shift positioning member or plate 72 also includes outwardly sloping guide ramps or surfaces 72e and inwardly sloping guide ramps or surfaces 72f that are angled towards each other in a zig-zag pattern. in other words, the guide ramps or surfaces 72e and 72f are arranged with one guide ramp being located adjacent one of the position retaining recesses 72b and 72c, respectively, to guide the detent pin 73b between adjacent ones of the position retaining recesses when the shift positioning plate 72 is rotated in the winding direction by operation of the main operating lever.

The center opening 72a is a non-circular opening that mates with the projections 52a of the wire takeup member 52 so that the wire takeup member 52 and the shift positioning plate 72 rotate together. In this embodiment, the first recesses 72b of the first toothed segment and the second recesses 72c of the second toothed segment are formed by a single detent retaining slot in the shift positioning plate 72. The second recesses 72c of the second toothed segment are spaced radially farther from the rotational axis than the first recesses 72b of the first toothed segment.

The shift position releasing mechanism 64 is operatively coupled to both the user engagement part or lever 41 of the main operating member 36 and the secondary operating lever 58 such that either the user engagement part or lever 41 or the secondary operating lever 58 can be used to perform a shift operation. In particular, the secondary operating lever 58 is configured and arranged to operate independently of the user engagement part or lever 41 during movement of the secondary operating lever 58. However, when the user engagement part or lever 41 is moved in the wire unwinding direction, the user engagement part or lever 41 and the secondary operating lever 58 rotate together.

FIGS. 17-23 illustrate the unwinding operation. While FIGS. 17-23 illustrate the secondary operating lever 58 being operated, the same movements occur when the user engagement part or lever 41 is moved in the same (wire unwinding) direction as the secondary operating lever 58 as seen in FIGS. 17-23. Thus, when either the rider pushes the user engagement part or lever 41 or the secondary operating lever 58 generally in an upward direction, the inner wire 18a is released to unwind the inner wire 18a from the outer peripheral edge of the wire takeup member 52. This inner wire releasing movement of the inner wire 18a operates the rear derailleur 16 to move the chain in a lateral direction relative to the center plane of the bicycle 10, such that the chain moves from one gear or sprocket to the next gear or a sprocket.

Preferably, as best seen in FIG. 16, the shift position releasing mechanism 64 basically includes a cam releasing member or plate 80, a position release pawl 81, a release pawl mounting pin 82, a release pawl biasing member 83 and a retaining clip 84. The position release pawl 81 is pivotally secured to the secondary operating lever 58 by the release pawl mounting pin 82 and the retaining clip 84. The release pawl biasing member 83 is a torsion spring that biases the position release pawl 81 to selectively engage the cam releasing plate 80.

As best seen in FIGS. 33-35, the cam releasing plate 80 basically includes a center opening 80a, a first cam segment with a plurality of force applying surfaces 80b defining a set of first detent moving cams, a second toothed segment with a plurality of second force applying surfaces 80c defining a set of second detent moving cams, and a set of unwinding ratchet teeth 80d. The cam releasing plate 80 also includes an unwinding tab 80e, a winding tab 80f and a set of winding ratchet teeth 80g.

In this embodiment, the first force applying surfaces 80b of the first cam segment and the second force applying surfaces 80c of the second cam segment are formed by a single slot in the cam releasing plate 80. The second force applying surfaces 80c of the second cam segment are spaced radially farther from the rotational axis than the first force applying surfaces 80*b* of the first cam segment. The tabs 80*e* and 80*f* of the cam releasing plate 80 extend perpendicularly from the main plane of the cam releasing plate 80. The tabs 80*e* and 80*f* of the cam releasing plate 80 are configured and arranged to allow a limited amount of rotational play between the shift positioning plate 72 and the cam releasing plate 80. However, once the tab 80*e* or 80*f* engages the shift positioning plate 72, the shift positioning plate 72 and the cam releasing plate 80 then generally move together about the main shift axis. This limited amount of rotational play between the shift positioning plate 72 and the cam releasing plate 80 allows the first and second force applying surfaces 80*b* and 80*c* of the cam releasing plate 80 to overlap with the first and second recesses 72*b* and 72*c* of the shift positioning plate 72, respectively. In other words, limited rotational movement between the shift positioning plate 72 and the cam releasing plate 80 causes one of the first and second force applying surfaces 80*b* and 80*c* of the cam releasing plate 80 to contact the detent pin 73*b* of the detent member 73 and push the detent pin 73*b* of the detent member 73 out of one of the first and second recesses 72*b* and 72*c* of the shift positioning plate 72 as seen in FIGS. 17-22.

The position release pawl 81 is pivotally secured to the secondary operating lever 58 to selectively engage the ratchet teeth 80*d* of the cam releasing plate 80. When the secondary operating lever 58 is in the normal rest position, the position release pawl 81 rests on the release pawl disengagement tab 70*d* so that the position release pawl 81 is maintained out of engagement with the ratchet teeth 80*d* of the cam releasing plate 80. However, when the rider pushes the secondary operating lever 58 from the normal rest position in a wire unwinding direction, the release pawl biasing member 83 biases the position release pawl 81 to engage one of the ratchet teeth 80*d* of the cam releasing plate 80. Further movement of the secondary operating lever 58 causes the cam releasing plate 80 to rotate such that the tab 80*e* of the cam releasing plate 80 contacts the shift positioning plate 72. At this point, this limited rotational movement between the shift positioning plate 72 and the cam releasing plate 80 causes one of the first and second force applying surfaces 80*b* and 80*c* of the cam releasing plate 80 to contact the detent pin 73*b* of the detent member 73 and push the detent pin 73*b* of the detent member 73 out of one of the first and second recesses 72*b* and 72*c* of the shift positioning plate 72. This movement of the detent pin 73*b* of the detent member 73 out of one of the first and second recesses 72*b* and 72*c* of the shift positioning plate 72 causes the cam arm 73*c* of the detent member 73 move against the biasing force applied by the position retaining ball 74 and the compression spring 75. This pivotal movement of the detent member 73 causes the cam arm 73*c* to ride along the position retaining ball 74 such that the force of the position retaining ball 74 and the compression spring 75 on the cam arm 73*c* switches from one of the cam surfaces of the cam arm 73*c* to the other of the cam surfaces of the cam arm 73*c*. Accordingly, the detent member 73 is forcibly moved from one shift position to the next shift position as seen in FIGS. 17-22. This arrangement allows the user engagement part or lever 41 and the secondary operating lever 58 to be operated in a unwire winding direction to shift at least two adjacent ones of the predetermined shift positions in a single continuous shift operation. In the illustrated embodiment, the user engagement part or lever 41 preferably has a range of movement that allows the rider to shift only one shift position at a time in the wire unwinding (release) direction. The secondary operating lever 58 preferably has a range of movement that allows the rider to selectively shift one, two and three shift position in a single continuous shift operation. In other words, the shift positioning plate 72 and the cam releasing plate 80 are configured and arranged to move together such that the detent member 73 toggles between adjacent ones of the first and second recesses 72*b* and 72*c* of the shift positioning plate 72 to allow the rider to shift one, two or three shift positions in a single continuous shift operation depending on the movement of the operating lever 41 or 58.

As best seen in FIG. 16, the shift position winding mechanism 66 basically includes the ratchet teeth 72*d* of the shift positioning plate 72, a position winding pawl 91, a winding pawl mounting pin 92, a winding pawl biasing member 93 and a retaining clip 94. The position winding pawl 91 is pivotally secured to attachment member 42 of the main operating member 36 by the winding pawl mounting pin 92 and the retaining clip 94. The winding pawl biasing member 93 is a torsion spring that biases the position winding pawl 91 to selectively engage the ratchet teeth 72*d* of the shift positioning plate 72.

When the user engagement part or lever 41 is in the normal rest position, the position winding pawl 91 rests on the winding pawl disengagement tab 70*e* so that the position winding pawl 91 is maintained out of engagement with the ratchet teeth 72*d* of the shift positioning plate 72. However, when the rider pushes the user engagement part or lever 41 from the normal rest position in a wire winding direction, the winding pawl biasing member 93 biases the position winding pawl 91 to engage one of the ratchet teeth 72*d* of the shift positioning plate 72 and one of the ratchet teeth 80*g* of the cam releasing plate 80. Further movement of the user engagement part or lever 41 causes the shift positioning plate 72 and the cam releasing plate 80 to rotate together. At this point, the shift positioning plate 72 and the cam releasing plate 80 rotate together such that the detent pin 73*b* of the detent member 73 rides out of one of the first and second recesses 72*b* and 72*c* of the shift positioning plate 72 along one of the guide surfaces 72*e* or 72*f* of the shift positioning plate 72. This movement of the detent pin 73*b* of the detent member 73 out of one of the first and second recesses 72*b* and 72*c* of the shift positioning plate 72 causes the cam arm 73*c* of the detent member 73 to move against the biasing force applied by the position retaining ball 74 and the compression spring 75. This pivotal movement of the detent member 73 causes the cam arm 73*c* to ride along the position retaining ball 74 such that the biasing force of the position retaining ball 74 and the compression spring 75 switches from one of the cam surfaces at the free end of the cam arm 73*c* to the other of the cam surfaces of the cam arm 73*c*. Accordingly, the detent member 73 is forcibly moved from one shift position to the next shift position as seen in FIGS. 19-23. This arrangement allows the user engagement part or lever 41 to be operated in a wire winding direction to shift at least two (preferably three) adjacent ones of the predetermined shift positions in a single continuous shift operation. In other words, the shift positioning plate 72 and the cam releasing plate 80 are configured and arranged to move together such that the detent member 73 toggles between adjacent ones of the first and second recesses 72*b* and 72*c* of the shift positioning plate 72 to allow the rider to shift one, two or three shift positions in a single continuous shift operation depending on the movement of the user engagement part or lever 41.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift and brake control device comprising:
   a bicycle mounting portion having a handlebar engagement surface that receives a bicycle handlebar having a handlebar axis;
   a shifting unit coupled to the bicycle mounting portion and configured to selectively move between a plurality of shift positions; and
   an operating member pivotally mounted about a braking axis to perform a braking operation and about a shifting axis to perform a shifting operation, the braking axis changing orientation from a first orientation to a different orientation with respect to the bicycle mounting portion when the operating member is pivoted about the shifting axis from a non-shifting position to a shifting position, and the handlebar axis being transverse to both the shifting axis and the braking axis in both the first orientation and the different orientation,
   the operating member including a user engagement part and a brake wire connecting part, with the brake wire connecting part being pivotally coupled about a pivot axis relative to the user engagement part.

2. The bicycle shift and brake control device according to claim 1, wherein
   the braking axis and the shifting axis are angled relative to each other.

3. A bicycle shift and brake control device comprising:
   a bicycle mounting portion;
   a shifting unit coupled to the bicycle mounting portion and configured to selectively move between a plurality of shift positions; and
   an operating member pivotally mounted about a braking axis to perform a braking operation and about a shifting axis to perform a shifting operation, the braking axis changing orientation from a first orientation to a different orientation with respect to the bicycle mounting portion when the operating member is pivoted about the shifting axis from a non-shifting position to a shifting position,
   the operating member including a user engagement part and a brake wire connecting part, with the brake wire connecting part being pivotally coupled about a pivot axis relative to the user engagement part, the shifting axis of the operating member being generally coincident with the pivot axis when the operating member is in a non-braking position.

4. A bicycle shift and brake control device comprising:
   a bicycle mounting portion;
   a shifting unit coupled to the bicycle mounting portion and configured to selectively move between a plurality of shift positions; and
   an operating member pivotally mounted about a braking axis to perform a braking operation and about a shifting axis to perform a shifting operation, the braking axis changing orientation from a first orientation to a different orientation with respect to the bicycle mounting portion when the operating member is pivoted about the shifting axis from a non-shifting position to a shifting position,
   the operating member including a user engagement part and a brake wire connecting part, with the brake wire connecting part being pivotally coupled about a pivot axis relative to the user engagement part, with the brake wire connecting part including a support structure pivotally coupled to the user engagement part about the pivot axis, and a wire attachment member movably coupled to the support structure.

5. The bicycle shift and brake control device according to claim 4, wherein
   the wire attachment member is coupled to the support structure by a universal coupling with the universal coupling providing at least two degrees of annular movement between the wire attachment member and the brake wire connecting part.

6. The bicycle shift and brake control device according to claim 5, wherein
   the support structure includes a shaft that slidably engages the universal coupling such that the wire attachment member is slidably mounted to the support structure.

7. The bicycle shift and brake control device according to claim 6, wherein
   the shaft of the support structure is arranged to form an acute angle with the shifting axis of the operating member when the operating member is in a non-braking position, and to be generally parallel to the shifting axis of the operating member when the operating member is in a braking position.

8. A bicycle shift and brake control device comprising:
   a bicycle mounting portion having a handlebar engagement surface that receives a bicycle handlebar having a handlebar axis;
   a shifting unit coupled to the bicycle mounting portion and configured to selectively move between a plurality of shift positions; and
   an operating member pivotally mounted about a braking axis to perform a braking operation and about a shifting axis to perform a shifting operation, the braking axis changing orientation from a first orientation to a different orientation with respect to the bicycle mounting portion when the operating member is pivoted about the shifting axis from a non-shifting position to a shifting position, and the handlebar axis being transverse to both the shifting axis and the braking axis in both the first orientation and the different orientation,
   the operating member including a user engagement part and a brake wire connecting part, with the brake wire connecting part being pivotally coupled about a pivot axis relative to the user engagement part,
   the shifting unit including a wire take up member being movably disposed around the shifting axis.

9. The bicycle shift and brake control device according to claim 8, wherein
   the shifting unit includes a wire release member operatively coupled to the wire take up member.

10. A bicycle shift and brake control device comprising:
    a bicycle mounting portion;
    a shifting unit coupled to the bicycle mounting portion and configured to selectively move between a plurality of shift positions; and
    an operating member pivotally mounted about a braking axis to perform a braking operation and about a shifting axis to perform a shifting operation, the braking axis changing orientation from a first orientation to a different orientation with respect to the bicycle mounting portion when the operating member is pivoted about the shifting axis from a non-shifting position to a shifting position, the operating member including a user engagement part and a brake wire connecting part, with the brake wire connecting part being pivotally coupled about a pivot axis relative to the user engagement part, the shifting unit including a wire take up member being movably disposed around the shifting axis and a wire release member operatively coupled to the wire take up member such that the wire release member selectively releases the wire take up member by one shift position when the wire release member is partially moved from a rest position to a first release position and two shift positions when the wire release member is moved from the rest position past the first release position to a second release position in a single progressive movement of the wire release member.

11. A bicycle shift and brake control device comprising:

a bicycle mounting portion;

a shifting unit coupled to the bicycle mounting portion and configured to selectively move between a plurality of shift positions; and an operating member pivotally mounted about a braking axis to perform a braking operation and about a shifting axis to perform a shifting operation, the braking axis changing orientation from a first orientation to a different orientation with respect to the bicycle mounting portion when the operating member is pivoted about the shifting axis from a non-shifting position to a shifting position, the operating member including a user engagement part and a brake wire connecting part, with the brake wire connecting part being pivotally coupled about a pivot axis relative to the user engagement part, the shifting unit including a wire take up member being movably disposed around the shifting axis and a wire release member operatively coupled to the wire take up member, the operating member being operatively coupled to the wire take up member to perform an upshifting operation when moved in a first direction from a rest position and a downshifting operation when moved in a second direction from the rest position.

12. A bicycle control device comprising:

a bicycle mounting portion; and an operating member pivotally coupled to the bicycle mounting portion about a main operating axis to perform a control operation, the operating member including a user engagement part and a connecting portion, with the connecting portion including a support structure and a wire attachment member, the wire attachment member being movably coupled to the support structure by a universal coupling, with the universal coupling providing at least two degrees of annular movement between the wire attachment member and the support structure.

13. The bicycle control device according to claim 12, wherein the support structure includes a shaft that slidably engages the universal coupling such that the wire attachment member is slidably mounted to the support structure.

14. The bicycle control device according to claim 13, wherein the connecting portion is pivotally coupled to the user engagement part about a secondary pivot axis.

15. The bicycle control device according to claim 14, wherein the shaft of the support structure is arranged to form an acute angle with the secondary pivot axis.

16. The bicycle control device according to claim 12, wherein the bicycle mounting portion has a shifting unit operatively coupled to the operating member, and the operating member is further arranged to pivot about a shifting axis to perform a shift operation.

17. The bicycle control device according to claim 16, wherein the shifting unit includes a wire take up member being movably disposed around the shifting axis.

18. The bicycle control device according to claim 17, wherein the connecting portion of the support structure is pivotally coupled to the user engagement part about a secondary pivot axis.

19. The bicycle control device according to claim 18, wherein the support structure includes a shaft that slidably engages the universal coupling such that the wire attachment member is slidably mounted to the support structure.

20. The bicycle control device according to claim 19, wherein the shaft of the support structure is arranged to form an acute angle with the shifting axis of the operating member when the operating member is in a non-braking position, and to be generally parallel to the shifting axis of the operating member when the operating member is in a braking position.

21. The bicycle control device according to claim 12, wherein the universal coupling forms a ball joint with the wire attachment member.

22. The bicycle control device according to claim 21, wherein the universal coupling has a ball shaped outer surface that is disposed in a partially spherical inner surface of the wire attachment member.

\* \* \* \* \*